(12) United States Patent
Norollahisomarin

(10) Patent No.: US 11,637,463 B1
(45) Date of Patent: Apr. 25, 2023

(54) DOUBLE ROTOR BRUSHLESS DIRECT-CURRENT MOTOR WITH FLUID COOLING

(71) Applicant: RH Motor Industry, LLC, Ft. Lauderdale, FL (US)

(72) Inventor: Reza Norollahisomarin, Ft. Lauderdale, FL (US)

(73) Assignee: RH Motor Industry, LLC, Ft. Lauderdale, FL (US)

( * ) Notice: Subject to any disclaimer, the term of this patent is extended or adjusted under 35 U.S.C. 154(b) by 0 days.

(21) Appl. No.: 17/966,868

(22) Filed: Oct. 16, 2022

(51) Int. Cl.
  *H02K 1/20* (2006.01)
  *H02K 9/19* (2006.01)
  *H02K 16/02* (2006.01)

(52) U.S. Cl.
  CPC ............... *H02K 1/20* (2013.01); *H02K 9/19* (2013.01); *H02K 16/02* (2013.01)

(58) Field of Classification Search
  CPC ............. H02K 1/20; H02K 9/19; H02K 16/02
  USPC ........................................................ 310/54
  See application file for complete search history.

(56) References Cited

U.S. PATENT DOCUMENTS

| | | | |
|---|---|---|---|
| 6,812,612 B2 | 11/2004 | Schunk et al. | |
| 6,894,418 B2 | 5/2005 | Jones et al. | |
| 6,992,419 B2 | 1/2006 | Kim et al. | |
| 7,687,945 B2 | 3/2010 | Matin et al. | |
| 7,737,585 B2 | 6/2010 | Bähr et al. | |
| 7,911,091 B2 * | 3/2011 | Takenaka | H02K 5/203 310/58 |
| 8,264,114 B2 | 9/2012 | Taniguchi et al. | |
| 8,847,522 B2 | 9/2014 | Nashiki et al. | |
| 9,467,030 B2 | 10/2016 | Camilleri et al. | |
| 9,470,238 B2 | 10/2016 | Vande Sande et al. | |
| 9,472,997 B2 | 10/2016 | Figgins et al. | |
| 9,712,011 B2 | 7/2017 | Pyrhönen et al. | |
| 10,284,053 B2 | 5/2019 | Saiki et al. | |
| 11,245,309 B2 | 2/2022 | Marvin | |
| 2007/0252447 A1 | 11/2007 | Ionel et al. | |
| 2014/0300223 A1 * | 10/2014 | Yamada | H02K 3/24 310/54 |

(Continued)

FOREIGN PATENT DOCUMENTS

| | | | | |
|---|---|---|---|---|
| KR | 101140924 B1 | 5/2012 | | |
| WO | 2019091351 A1 | 5/2019 | | |
| WO | WO-2021089188 A1 * | 5/2021 | ............. | H02K 1/146 |

*Primary Examiner* — Alex W Mok
(74) *Attorney, Agent, or Firm* — Bekiares Eliezer LLP

(57) ABSTRACT

The present disclosure provides a brushless direct-current (BLDC) motor comprising: a double rotor comprising: an inner rotor and outer rotor secured to a rotor housing having a plurality of N-pole and S-pole magnets, a stator comprising: a stator base portion, a plurality of cooling structures distributed around the stator base portion, a plurality of stator teeth, each of the plurality of stator teeth being disposed in a slot and having a plurality of windings wound around the stator tooth; and a liquid distribution comprising: a liquid introduction module comprising: a liquid introduction base portion, and a plurality of fluid channels being secured to the liquid introduction top surface, and housed within the plurality of cooling structures, and a liquid injection portion configured to channel liquid into the cavity and the plurality of cooling structures; a liquid egress module comprising: a liquid egress base portion secured to the stator.

19 Claims, 26 Drawing Sheets

(56) References Cited

U.S. PATENT DOCUMENTS

2020/0259399 A1* 8/2020 Marvin .................... H02K 9/19
2020/0350800 A1* 11/2020 Hurry ...................... H02K 9/19
2021/0242751 A1* 8/2021 Rippel ..................... H02K 9/19

* cited by examiner

FIG. 13C
FIG. 13B
FIG. 13A

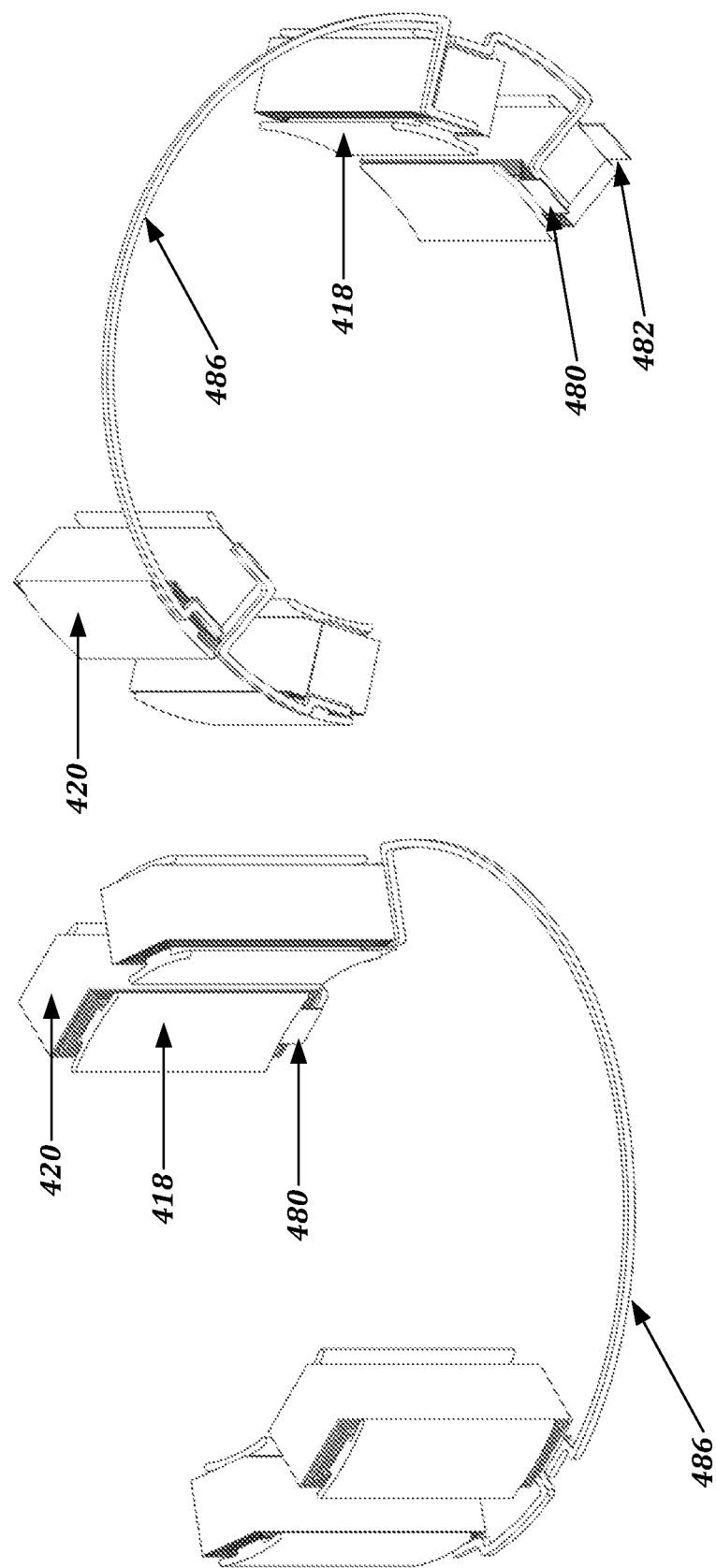

DOUBLE ROTOR BRUSHLESS DIRECT-CURRENT MOTOR WITH FLUID COOLING

FIELD OF DISCLOSURE

The present disclosure generally relates to brushless direct-current (BLDC) motors with a radial core, a stator, and two sets of rotors.

BACKGROUND

A BLDC motor is a type of synchronous motor in which a rotor is the sole bearer of magnets and does not require power (i.e., no connections, no commutator and no brushes) to function. In place of these, the motor employs control circuitry to detect where the rotor is at certain times. BLDC motors employ along with controllers, rotary encoders and/or a Hall sensor. Conventional BLDC motors can produce peak power of 5 KW per one KG of their weight.

BLDC motors classified into a radial type have flux generated perpendicular to the axis of rotation and having a generally toroidal and/or cylindrical structure.

Common stators for BLDC motors have various types of cooling including air, liquid and two-phase cooling. Air blown through the center of the motor is common for many BLDC motors. Liquid jackets or laminations are common of use in other motors emanating more heat than air cooling can properly cool. Though liquid cooling provides more heat displacement, construction can be complicated, costly, and require more materials for construction and a larger housing to house the liquid channel laminations or jackets.

Some BLDC motors have internal rotor, of which magnets are disposed circumferentially within a gap in the middle of the stator. Other BLDC motors have an external rotor, of which magnets are disposed circumferentially around the outer perimeter of the stator. A BLDC motor with an inner rotor and an outer rotor has also been contemplated, but without the suggestion for improvements necessary to increase output at a substantially higher scale while maintaining a compact design.

A BLDC motor that, when compared with conventional BLDC motors, produces increased power output more efficiently while being properly cooled in a compact design is needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In some embodiments, the present disclosure may provide a brushless direct-current (BLDC) motor comprising: a double rotor comprising: a double rotor housing; an inner rotor secured to a rotor housing inner wall, the inner rotor comprising a first set of a plurality of N-pole and S-pole magnets disposed alternately in annular form, an outer rotor secured to a rotor housing outer wall, the outer rotor comprising a second set of the plurality of N-pole and S-pole magnets disposed alternately in annular form; a rotational shaft rotatably mounted through an inner aperture of the double rotor housing; a stator comprising: a stator base portion, a plurality of cooling structure apertures distributed circumferentially around the stator base portion, and a plurality of cooling structures, each of the plurality of cooling structures being disposed over one of the plurality of cooling structure apertures thereby defining a plurality of slots therebetween, a plurality of stator teeth are electrically connected to one another, each of the plurality of stator teeth being disposed in one of the plurality of slots and having a plurality of windings wound around a middle portion of the stator tooth; a liquid distribution system configured to transfer heat out of the motor, the liquid distribution system comprising: a liquid introduction module positioned within a recess of the stator, the liquid introduction module comprising: a liquid introduction base portion being planar and ring-shaped comprising: a plurality of support members disposed on a top surface of the liquid introduction base member and configured to contact a bottom surface of the stator base portion thereby forming a cavity within the recess between the stator base portion and the liquid introduction base portion, and a plurality of liquid inlet apertures distributed proportionally in accordance with the plurality of cooling structures, a plurality of fluid channels, each of the plurality of fluid channels being: secured to the liquid introduction top surface on one end, disposed over one of the plurality of liquid inlet apertures, housed within one of the plurality of cooling structures, and configured to channel fluid out of one of the plurality of cooling structures, and a liquid injection portion secured to a bottom surface of the liquid introduction base portion, the liquid injection portion being configured to channel a flow of liquid into the cavity and the plurality of cooling structures; a liquid egress module comprising: a liquid egress base portion being planar and ring-shaped and secured to an outer edge of a bottom portion of the stator and an outer edge of a bottom portion of the stator thereby forming a liquid egress cavity configured to channel used liquid directed from the cooling structures out of the apparatus via a liquid outlet disposed on a bottom surface of the liquid egress base portion.

In further embodiments, the present disclosure may provide a brushless direct-current (BLDC) motor comprising: a double rotor structure mounted in a rotative manner relative to a stator: a double rotor housing comprising: a rotor housing base portion being planar and ring-shaped, a rotor housing outer wall extending orthogonally from an outer edge of the rotor housing base portion, and a rotor housing inner wall extending orthogonally from an inner portion of the rotor housing base portion, an inner rotor secured to an outer portion of the rotor housing inner wall, the inner rotor comprising a first set of a plurality of N-pole and S-pole magnets disposed alter-nately in annular form, an outer rotor secured to (an inner portion of) the rotor housing outer wall, the outer rotor comprising a second set of the plurality of N-pole and S-pole magnets disposed alter-nately in annular form, and a rotational shaft rotatably mounted through an inner aperture of the double rotor housing; a stator comprising: a stator base portion being ring-shaped with a rectangular cross-section comprising: a stator base top surface, a stator base bottom surface, a stator inner wall spanning an inner perimeter of the stator base portion, the stator inner wall being oriented orthogonally to the stator base top surface and the stator base bottom surface, and a stator outer wall spanning an outer perimeter of the stator base portion, the stator outer wall being oriented orthogonally to the stator base top surface and the stator base bottom surface, a plurality of cooling structure apertures distributed circumferentially around the stator base portion, and a plurality of cooling structures, each of the plurality of cooling structures being: secured to the stator base top surface, and disposed over one of the plurality of cooling structure apertures, a plurality of stator teeth, each of the plurality of stator teeth being disposed between two of the plurality of cooling structures and having a plurality of windings wound around a middle portion of the stator tooth being electrically connected to form a plurality of phases; and a liquid distribution system configured to transfer heat out of the motor, the liquid distribution system comprising: a liquid introduction module housed within a recess of the stator cavity comprising: a liquid introduction base portion being planar and ring-shaped comprising: a liquid introduction top surface, and a liquid introduction bottom surface, a plurality of support members disposed on the liquid introduction top surface and configured to contact the stator base bottom surface forming a cavity between the stator base bottom surface and the liquid introduction top surface, a plurality of liquid inlet apertures distributed proportionally in accordance with the plurality of hollow protrusions, a plurality of fluid channels, each of the plurality of fluid channels being: dimensioned smaller in width than each of the plurality of cooling structure apertures, secured to the liquid introduction top surface on one end, disposed over one of the plurality of liquid inlet apertures, housed within one of the plurality of cooling structures, and configured to channel fluid out of one of the plurality of cooling structures into a liquid egress cavity, and a liquid injection portion secured to the bottom surface configured to channel a flow of liquid into the liquid introduction module, and a liquid egress module comprising: a liquid egress base portion being planar and ring-shaped, the fluid egress base portion comprising: a liquid egress top surface secured to a bottom edge of the stator inner wall and a bottom edge of the stator outer wall thereby forming a liquid egress cavity, and a liquid egress bottom surface, a liquid injection aperture configured to receive the liquid injection portion, and a liquid outlet disposed on the liquid egress bottom surface.

In further embodiments, the present disclosure may provide a brushless direct-current (BLDC) motor comprising: a double rotor comprising: an inner rotor secured to an inner wall of a rotor housing, the inner rotor comprising a first set of a plurality of N-pole and S-pole magnets disposed alternately in annular form, an outer rotor secured to an outer wall of the rotor housing, the outer rotor comprising a second set of the plurality of N-pole and S-pole magnets disposed alternately in annular form; a stator comprising: a stator base portion, a plurality of cooling structures, distributed circumferentially around the stator base portion and defining a plurality of slots therebetween, a plurality of stator teeth, each of the plurality of stator teeth being disposed in one of the plurality of slots and having a plurality of windings wound around a middle portion of the stator tooth, wherein the plurality of stator teeth are electrically connected; and a liquid distribution system configured to transfer heat out of the motor, the liquid distribution system comprising: a liquid introduction module positioned within a recess of the stator, the liquid introduction module comprising: a liquid introduction base portion forming a cavity within the recess between the stator base portion and the liquid introduction base portion, and a plurality of fluid channels, each of the plurality of fluid channels being: secured to a top surface of the liquid introduction base portion, housed within one of the plurality of cooling structures, and configured to channel fluid out of one of the plurality of cooling structures, and a liquid injection portion secured to a bottom surface of the liquid introduction base portion, the liquid injection portion being configured to channel a flow of liquid into the cavity and the plurality of cooling structures; a liquid egress module comprising: a liquid egress base portion being planar and ring-shaped and secured to a bottom portion of the stator thereby forming a liquid egress cavity configured to channel liquid directed from the cooling structures out of the apparatus via a liquid outlet of the liquid egress base portion.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 13A illustrates a portion of a plurality of windings 420;

FIG. 13B illustrates a front view of the portion of the plurality of windings 420;

FIG. 13C illustrates a side view of a pre-wound winding 424;

FIG. 20A illustrates a perspective view of at least a portion of the apparatus 100;

FIG. 20B illustrates a perspective view of at least a portion of the apparatus 100;

DETAILED DESCRIPTION

Figure 1:
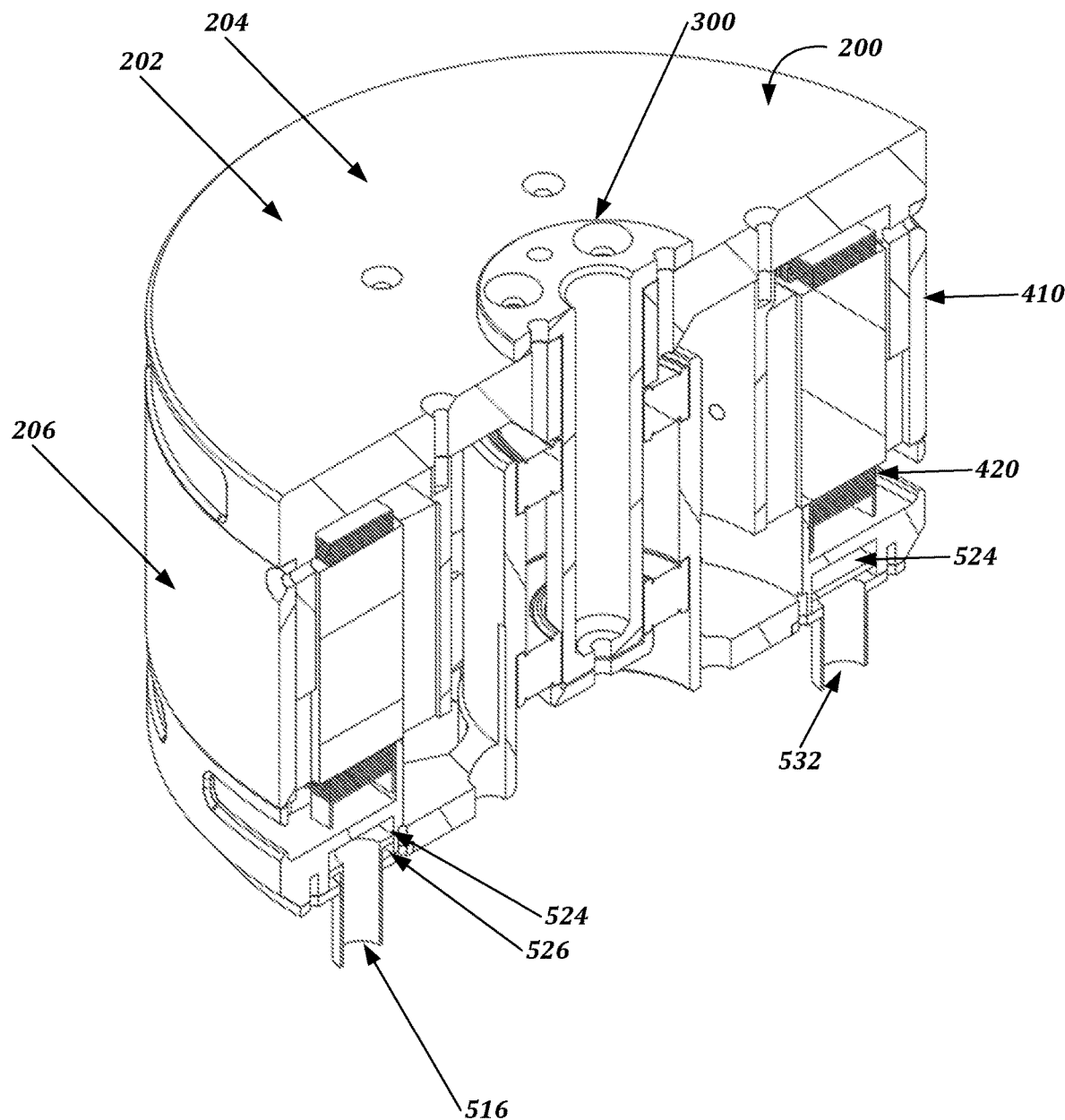
FIG. 1 illustrates a cross-sectional view of a double rotor brushless direct-current motor with fluid cooling apparatus 100.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of brushless direct-current (BLDC) motors, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

A brushless direct-current (BLDC) motors with a radial core, a stator, and two sets of rotors (apparatus 100) may be provided. The apparatus may produce mechanical energy when supplied by three phase electricity from an electronic speed controller. In an alternate purpose, the apparatus may generate three phase electricity when rotating mechanical power is applied to it.

The apparatus may have a stator with a number of teeth. Each tooth may have a predetermined number of coils would around it. The coils may be wound in such a way that allows for up to three times the length of windings wound around each tooth when compared to a conventional BLDC motor. One way the coils may be wound is in a unique S-shape configuration. The increased windings may produce an induced magnetic field of up to ten times the strength and up to three times the distance of the induced magnetic field.

The particular design of the apparatus 100 may allow for the ability to use proportionally thicker magnets (compared to standard BLDC motors) on the rotor of the apparatus. This increased thickness may increase magnetic attraction and repulsion playing the main role of generating power, thereby producing up to four times more power than ordinary BLDC motors. Further, thicker magnets may block magnetic flux leakage and help the apparatus motor to perform more efficiently.

Further, the apparatus may have a double rotor design with an inner rotor and an outer rotor, the inner rotor being oriented inside the inner perimeter of the stator, and the outer rotor being oriented outside the outer perimeter of the stator. The inner rotor and outer rotor may be independent to one another or operationally connected as to rotate in the same direction and speed.

Further, the stator may have cooling structures positioned in between the stator teeth. The cooling structures may be configured to fill and circulate liquid, thereby operating as a heat sink and draw away heat from the stator and the windings, the windings being in direct contact with the cooling structures, out of the apparatus. This may be accomplished by forming a cavity between the bottom of the stator and the cooling structures and having a channeling pipe inside each cooling structure. The liquid in the cooling structure will absorb heat radiating from the stator and windings configurations, and exfiltrate via the cooling structures into a lower cavity having an egress pipe configured to channel the heated liquid out of the apparatus.

Embodiments of the present disclosure may comprise methods, systems, and components comprising, but not limited to, at least one of the following:

A. A Double Rotor 200;
B. A Rotational Shaft Module 300;
C. A Stator 400;
D. A Fluid Distribution System 500;

In some embodiments, the present disclosure may provide an additional set of components for further facilitating the system. The additional set of components may comprise, but not be limited to:

E. An Electronic Controller; and
F. A Hall Sensor.

Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, the apparatus 100 and/or components thereof may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

molding a double rotor housing 202, the double rotor housing 202 comprising:
    a rotor housing base portion 204 being planar and ring-shaped,
    a rotor housing outer wall 206 extending orthogonally from an outer edge of the rotor housing base portion 204, and
    a rotor housing inner wall 208 extending orthogonally from an inner portion of the rotor housing base portion 204;

securing an inner rotor 210 to an outer portion of the rotor housing inner wall 208, the inner rotor 210 comprising a first set of a plurality of N-pole and S-pole magnets disposed alternately in annular form;

securing an outer rotor 214 to an inner portion of the rotor housing outer wall 206, the outer rotor 214 comprising a second set of the plurality of N-pole and S-pole magnets disposed alternately in annular form;

molding a stator base portion 402 being substantially ring-shaped with a rectangular cross-section, the stator base portion 402 comprising:
    a stator base top surface 404,
    a stator base bottom surface 406, a stator inner wall 408 spanning an inner perimeter of the stator base portion, and a stator outer wall 410 spanning an outer perimeter of the stator base portion, forming a plurality of cooling structure apertures 414 circumferentially around the stator base portion, securing a plurality of cooling structures 416 to the stator base top surface 404, each of the plurality of cooling structures 416 being disposed over one of the plurality of cooling structure apertures 414 thereby defining a plurality of slots therebetween;

securing one of a plurality of stator teeth 416 in each of the plurality of slots, each of the plurality of stator teeth 416 comprising a plurality of windings 420 wound around at least a portion of stator tooth 416;

electrically connecting the plurality of stator teeth 416 via a plurality of wires 424;

forming a liquid introduction module 502 comprising:

molding (and/or casting) a liquid introduction base portion 504 being planar and ring-shaped, comprising:

a liquid introduction top surface 506, and a liquid introduction bottom surface 508, securing plurality of support members 510 to the liquid introduction top surface 506, forming (and/or boring, and/or drilling) a plurality of fluid channel apertures 512 circumferentially around the liquid introduction base portion 504, securing a plurality of fluid channels 514 to the liquid introduction top surface 506, the plurality of fluid channels 514 being disposed over the plurality of fluid channel apertures 512, securing a liquid injection portion 516 to the liquid introduction bottom surface 508, the liquid injection portion 516 being configured to channel a flow of liquid into the liquid introduction module 502, forming a liquid egress module 518 comprising:

molding (and/or casting) a liquid egress base portion 520, being planar and ring-shaped, having a liquid egress top surface 528, and having a liquid egress bottom surface 530, forming a liquid injection aperture 534;

securing a liquid outlet 532 to the liquid egress bottom surface 530;

receiving at least a portion of the liquid injection portion 516 into the liquid injection aperture 534;

securing the plurality of support members 510 to the stator base bottom surface 406, thereby forming a liquid introduction cavity 524 between the stator base bottom surface 406 and the liquid introduction top surface 506;

securing the liquid egress top surface 528 to a bottom edge of the stator inner wall 408 and a bottom edge of the stator outer wall 410, thereby forming a liquid introduction cavity 524 between the stator base bottom surface 406 and the liquid introduction top surface 506, the liquid injection aperture 534 receiving the liquid injection portion 516;

mounting the double rotor structure 200 on the stator 300 such that the double rotor structure 200 can axially rotate around the stator 300, securing a rotational shaft 300 through an inner aperture of the double rotor housing 202, transmitting a direct electrical current through the plurality of windings 420, thereby creating an electromagnetic current, rotating the double rotor 300 thereby creating a torque, and activating the apparatus 100.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. System Configuration

One possible embodiment of a component of the system may be provided by the RH Motor Industry suite of products and services.

It is noted that the phrase "any other suitable shape" may be embodied as one or more (or any combination of) the following:

a. circular,
b. cylindrical,
c. pyramidal,
d. square,
e. conical,
f. rectangular,
g. polygonal,
h. toroidal (with any suitable cross-section),
i. trapezoidal,
j. triangular,
k. spherical,
l. rhomboidal,
m. organic,
n. pentagonal, and
o. prism shaped.

It is further noted that the term "fluid" may be used interchangeably with the term "liquid".

It is further noted that, when fully assembled and functional, the apparatus may utilize three phase electricity from an electronic speed controller along with other controllers, rotary encoders and/or a Hall sensor (mounted on the stator 400).

Accordingly, embodiments of the present disclosure provide an apparatus 100 comprised of a distributed set of components, including, but not limited to:

A. Double Rotor 200

At least FIGS. 1-3 and 15 illustrate the double rotor 200 consistent with an embodiment of the disclosure. The double rotor 200 may be used to react to magnetic flux created by the stator, thereby causing a rotational force causing the double rotor 200 to axially rotate. In some embodiments, the double rotor 200 may be mounted in a rotative manner relative to the stator. At least a portion of the double rotor 200 may be secured to other portions of the double rotor 200 and/or other portions (and/or components) of the apparatus 100 via nuts, bolts, screws, welding, adhesive, friction fit, and/or any other suitable securing means.

In some embodiments, the double rotor 200 may comprise a double rotor housing 202, illustrated at least in FIGS. 1, 10-11 and 15. The double rotor housing 202 may be used to retain, house, and/or engage elements of the double rotor 200. The double rotor housing 202 may be further used to engage, and/or operationally interact with other elements of the apparatus 100. In some embodiments, the double rotor housing 202 may comprise a rotor housing base portion 204, illustrated at least in FIGS. 1, 10-11 and 15. In some embodiments, the rotor housing base portion 204 may be being planar, ring-shaped, and/or toroidal in shape (with or without a square and/or rectangular cross-section). In some embodiments, the double rotor housing 202 may comprise a rotor housing outer wall 206, illustrated at least in FIGS. 1, 10-11 and 15. The rotor housing outer wall 206 may extend orthogonally from an outer edge of the rotor housing base portion 204. In some embodiments, the double rotor housing 202 may comprise a rotor housing inner wall 208. The rotor housing inner wall 208 may extend orthogonally from an inner portion of the rotor housing base portion 204.

Figure 10:
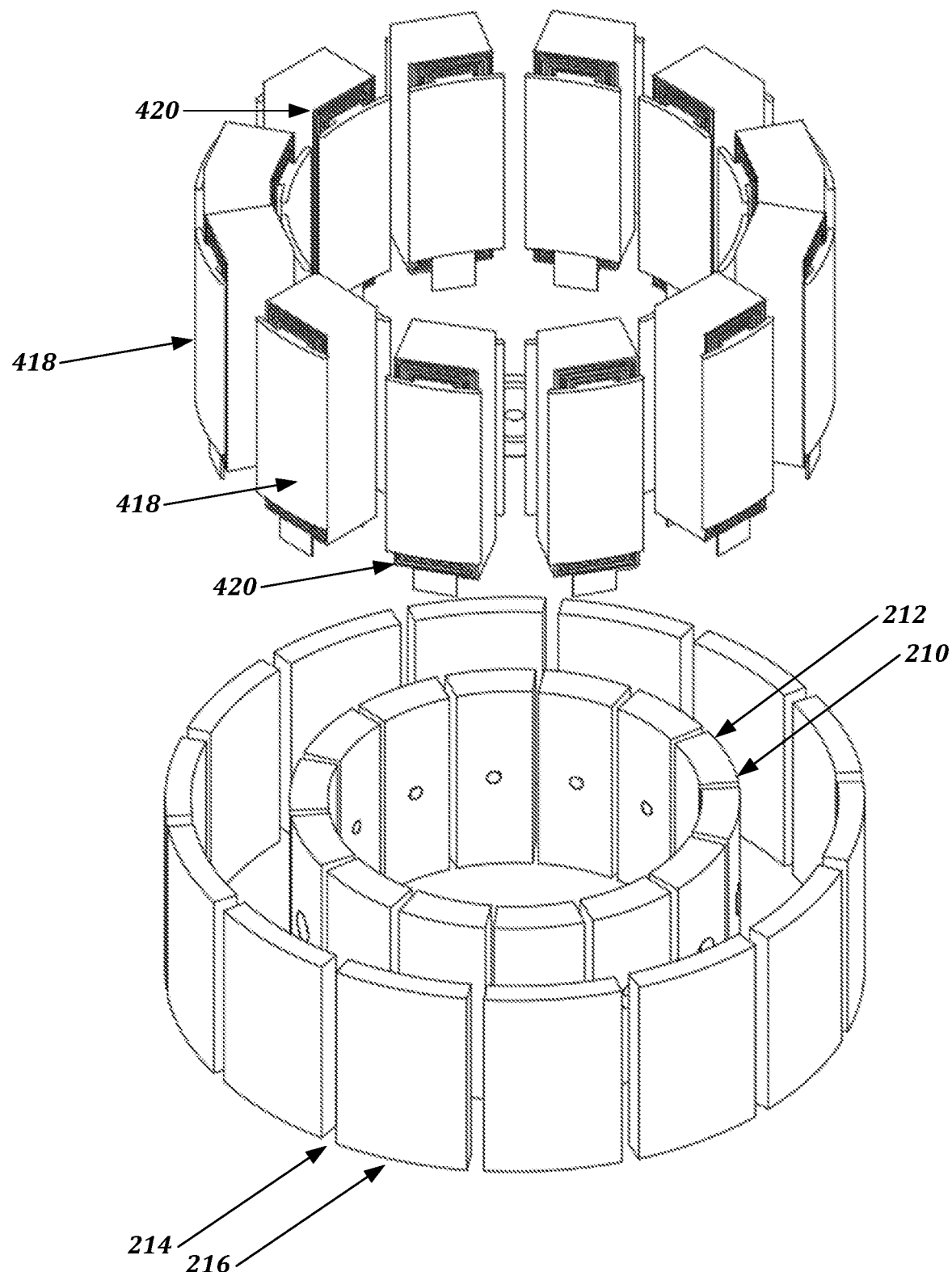
FIG. 10 illustrates portions of the stator 400 and portions of the double rotor 200.
Figure 11:
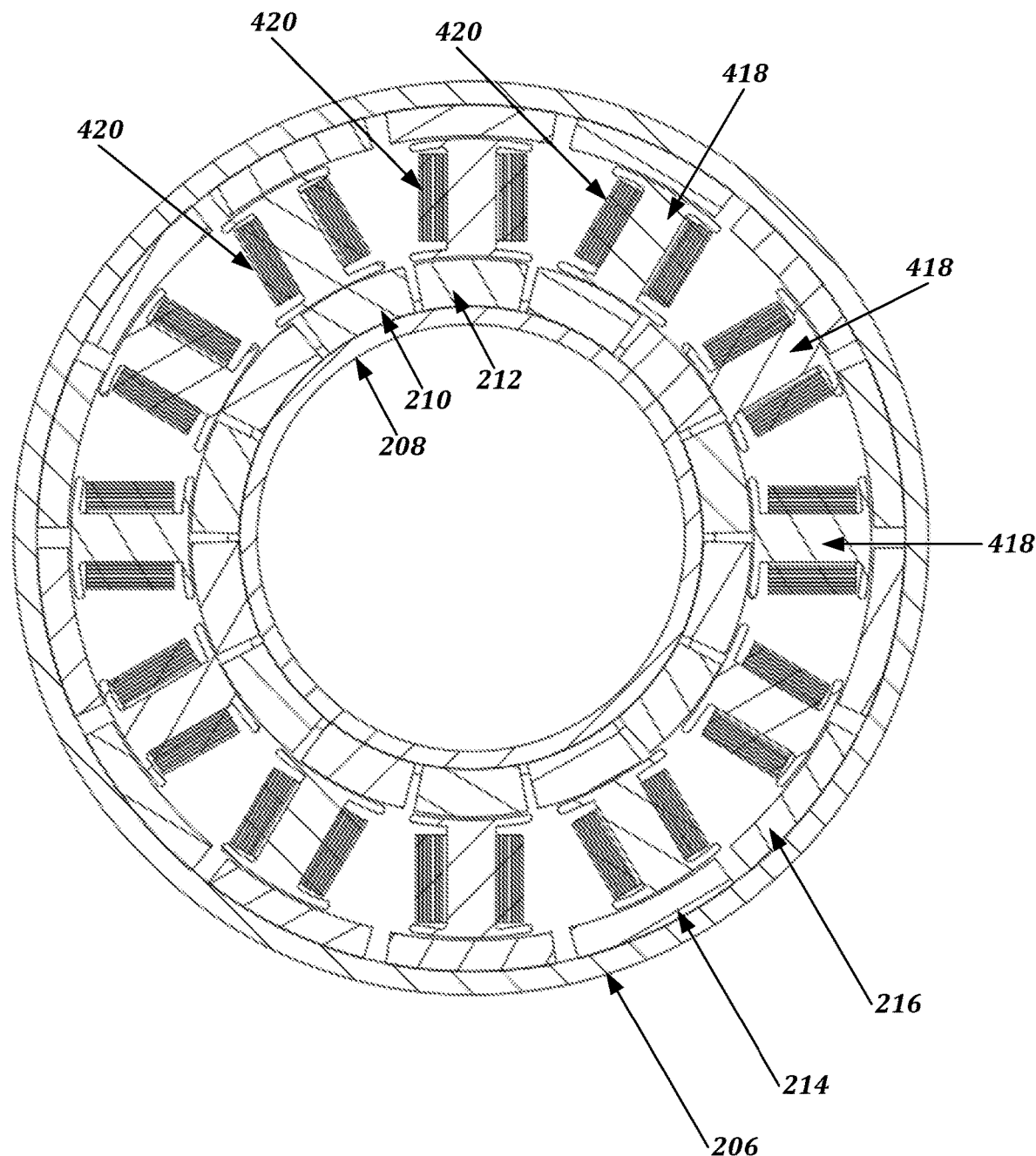
FIG. 11 illustrates a bottom cross-sectional view of portions of the stator 400 and portions of the double rotor 200.
Figure 12B:
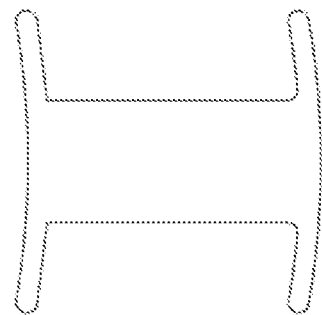
FIG. 12B illustrates a top view of the stator tooth of the plurality of stator teeth 418.
Figure 12A:
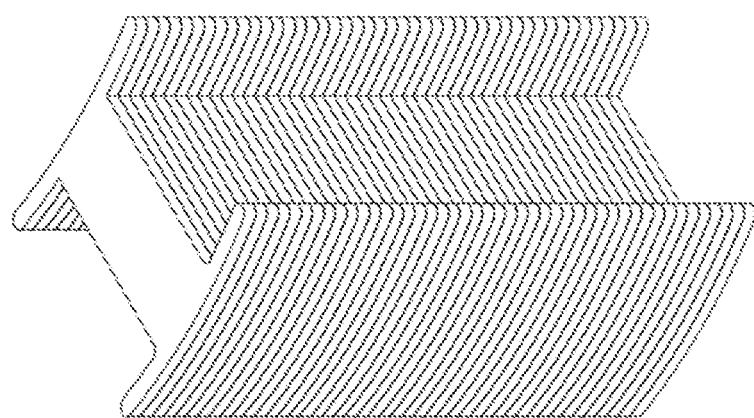
FIG. 12A illustrates a stator tooth of a plurality of stator teeth 418.
Figure 14B:
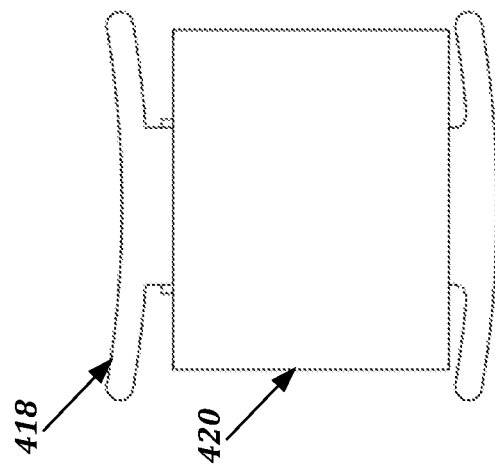
FIG. 14B illustrates a top view of the portion of the plurality of windings 420 wound around one of the plurality of stator teeth 418.
Figure 14A:
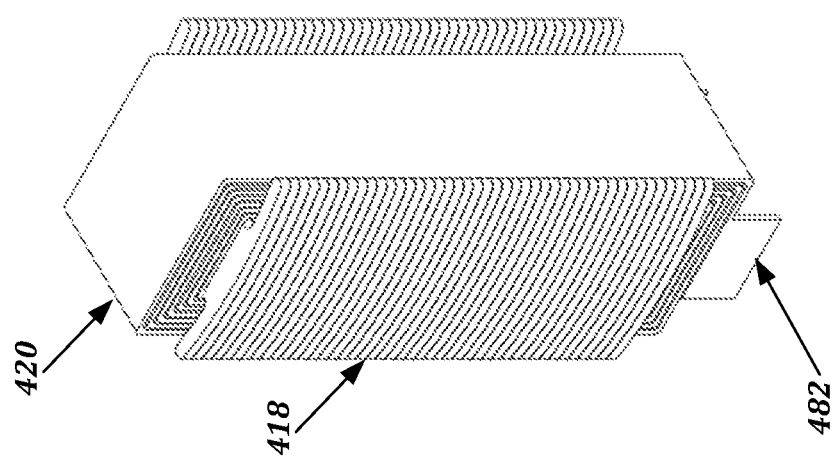
FIG. 14A illustrates a portion of the plurality of windings 420 wound around one of the plurality of stator teeth 418.
Figure 15:
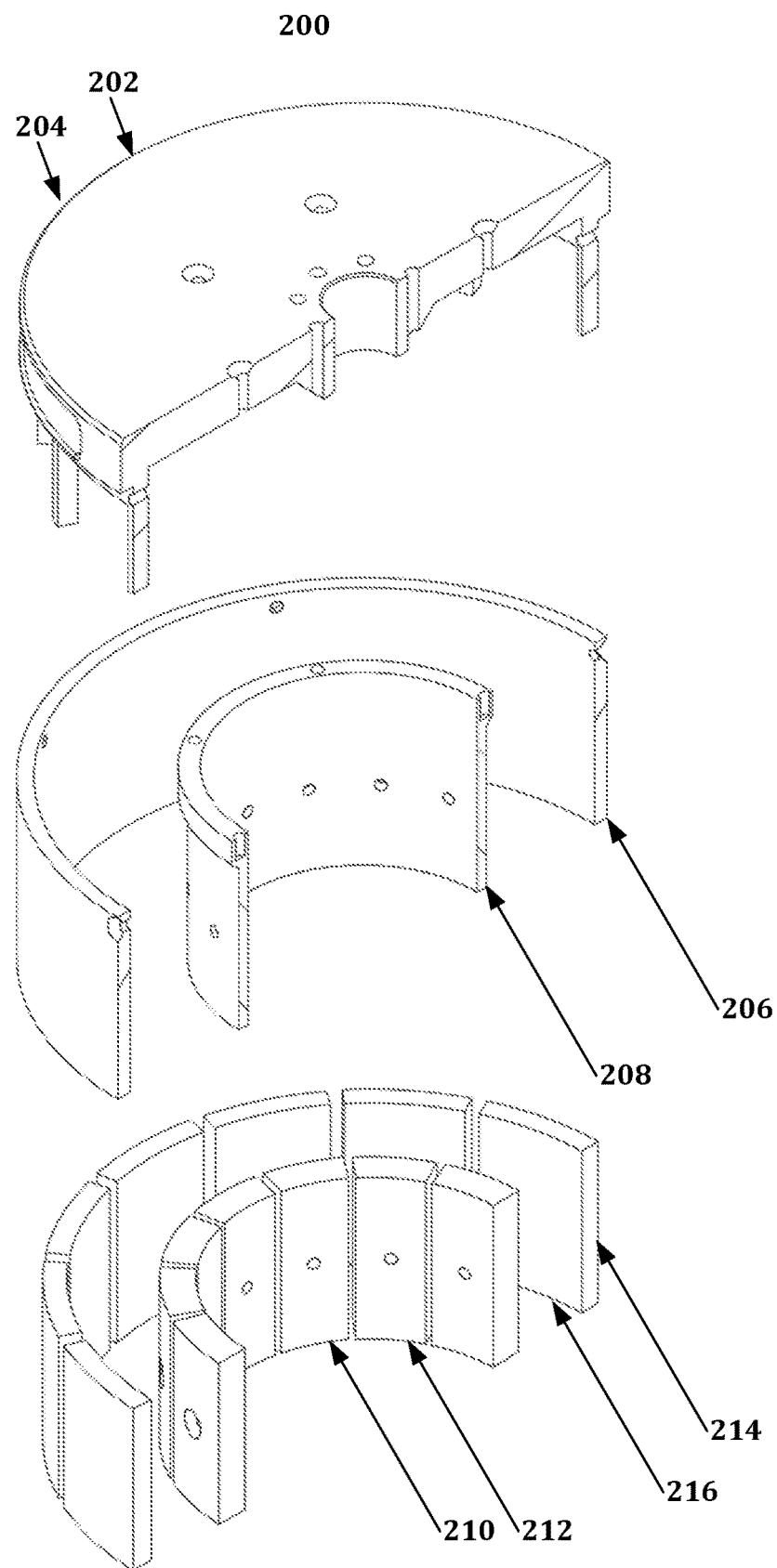
FIG. 15 illustrates an exploded view of the double rotor 200.
Figure 16B:
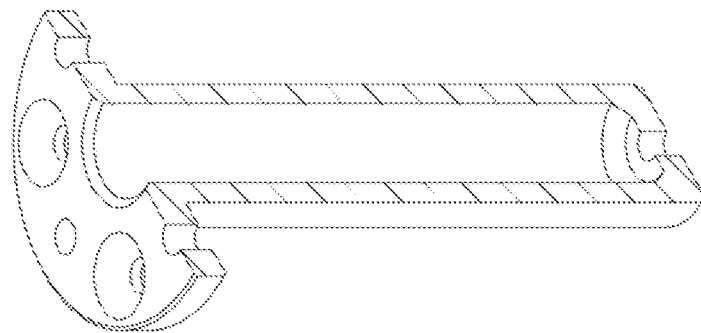
FIG. 16B illustrates a cross-sectional view of the rotational shaft module 300.
Figure 16A:
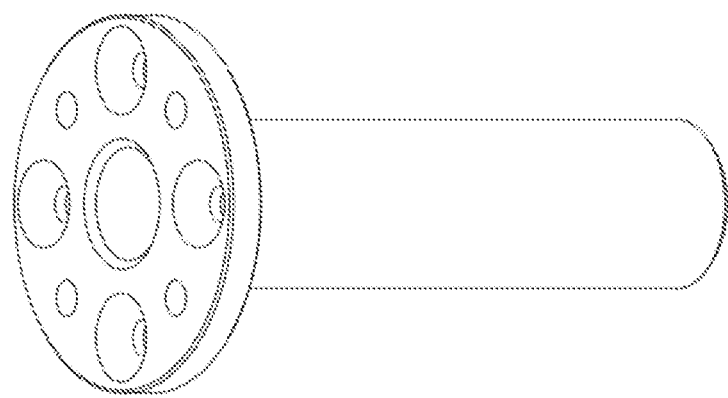
FIG. 16A illustrates a rotational shaft module 300.
Figure 17:
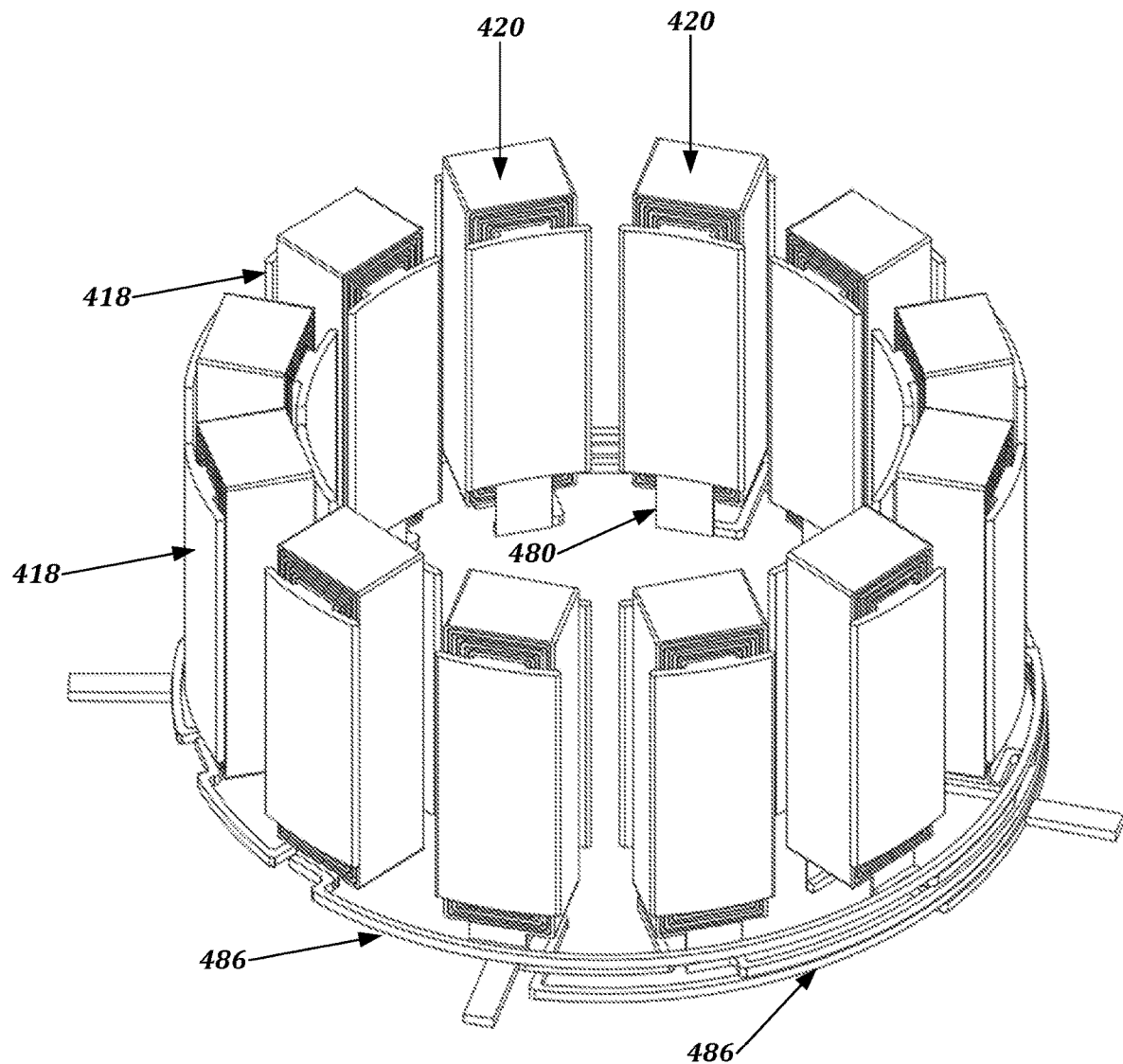
FIG. 17 illustrates a perspective view of at least a portion of the apparatus 100.
Figure 18:
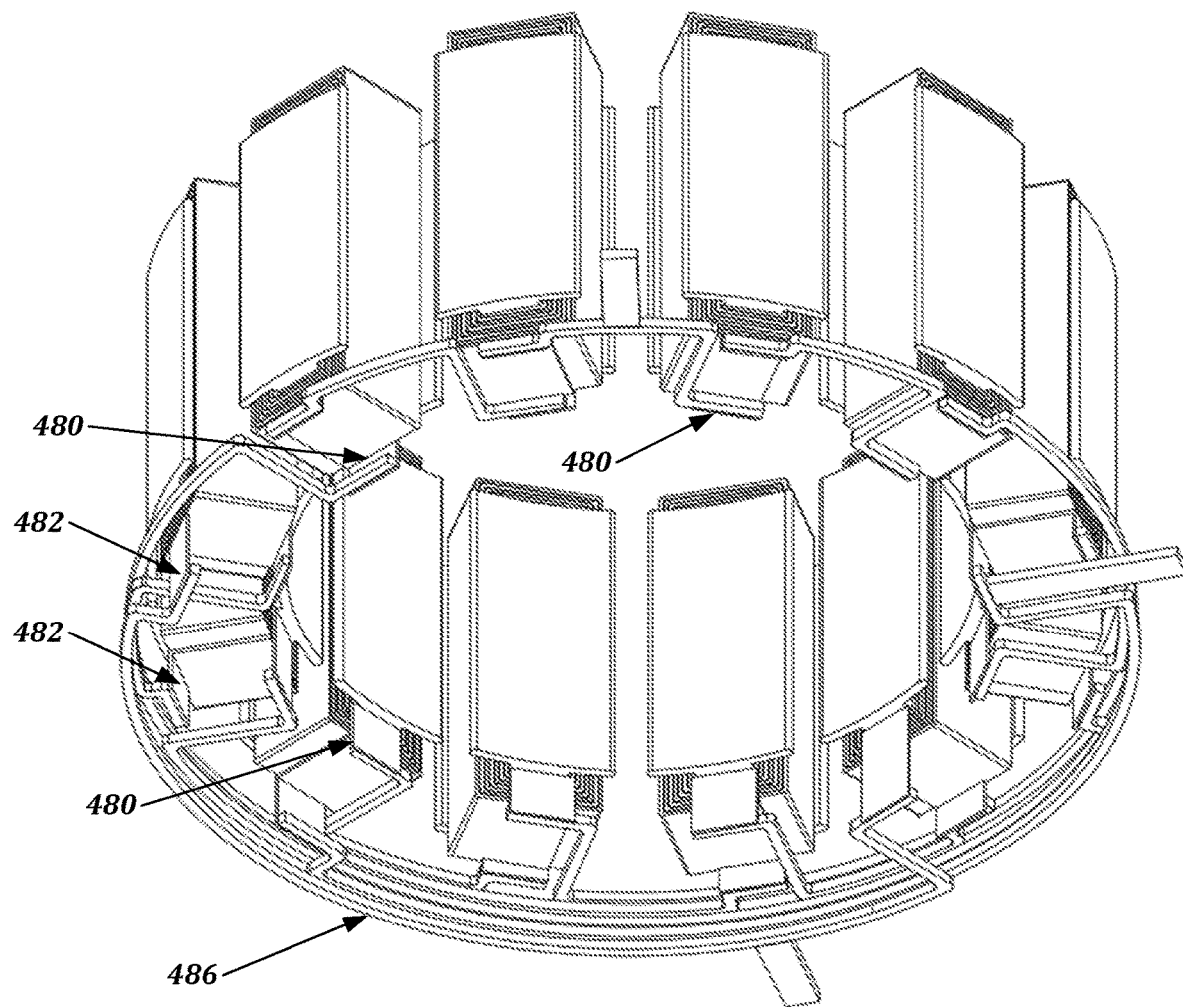
FIG. 18 illustrates a perspective view of at least a portion of the apparatus 100.
Figure 19:
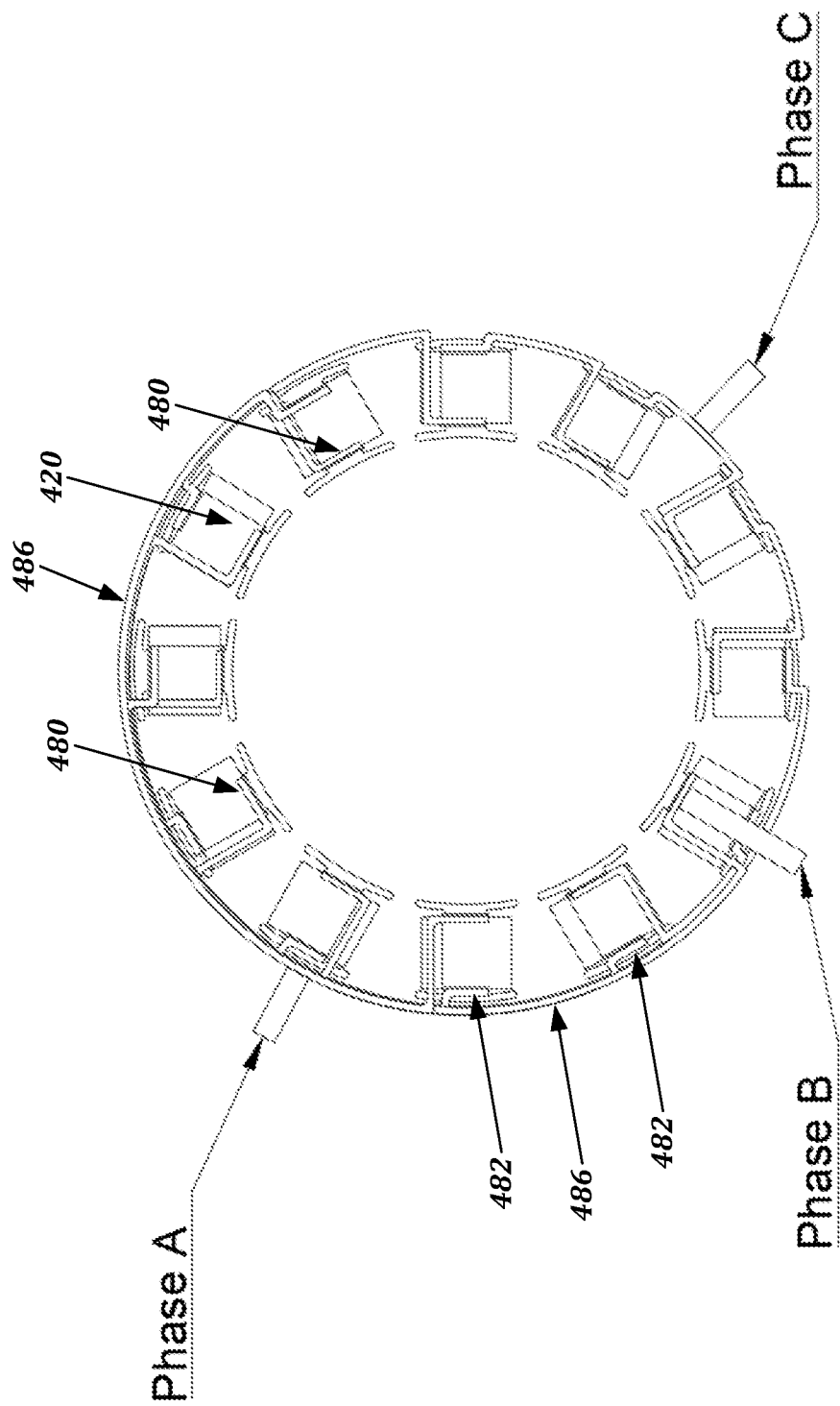
FIG. 19 illustrates a perspective view of at least a portion of the apparatus 100.
Figure 21B:
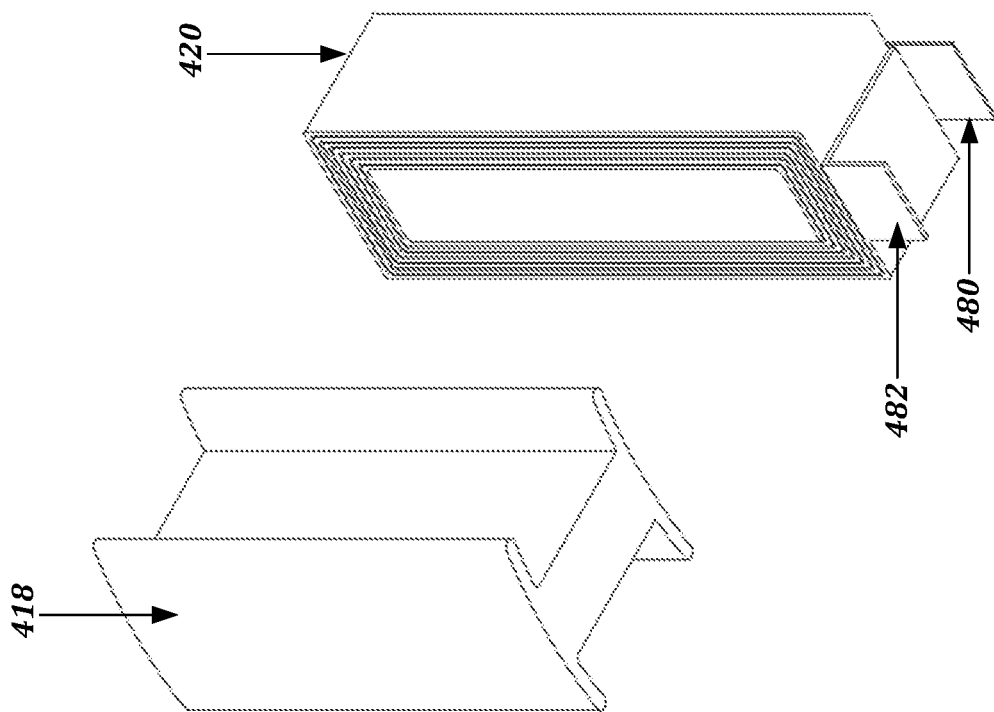
FIG. 21B illustrates a perspective view of at least a portion of the apparatus 100.
Figure 21A:
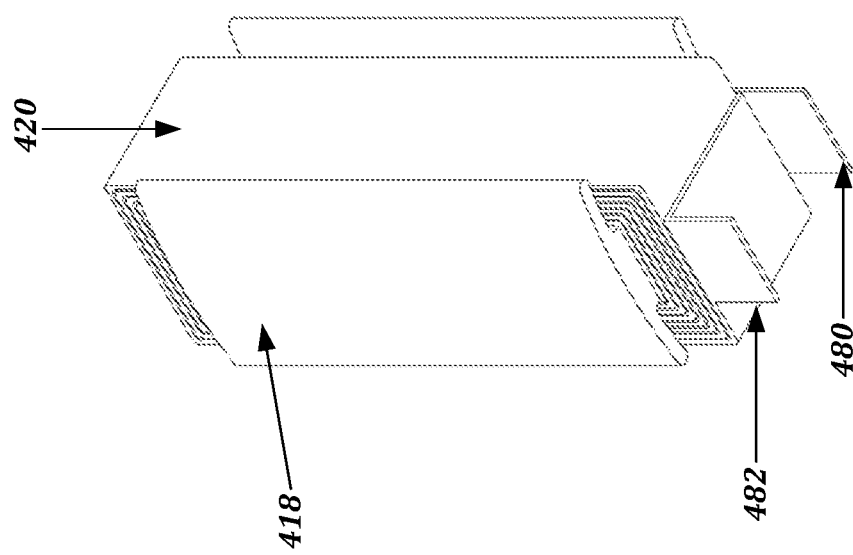
FIG. 21A illustrates a perspective view of at least a portion of the apparatus 100.
Figure 22:
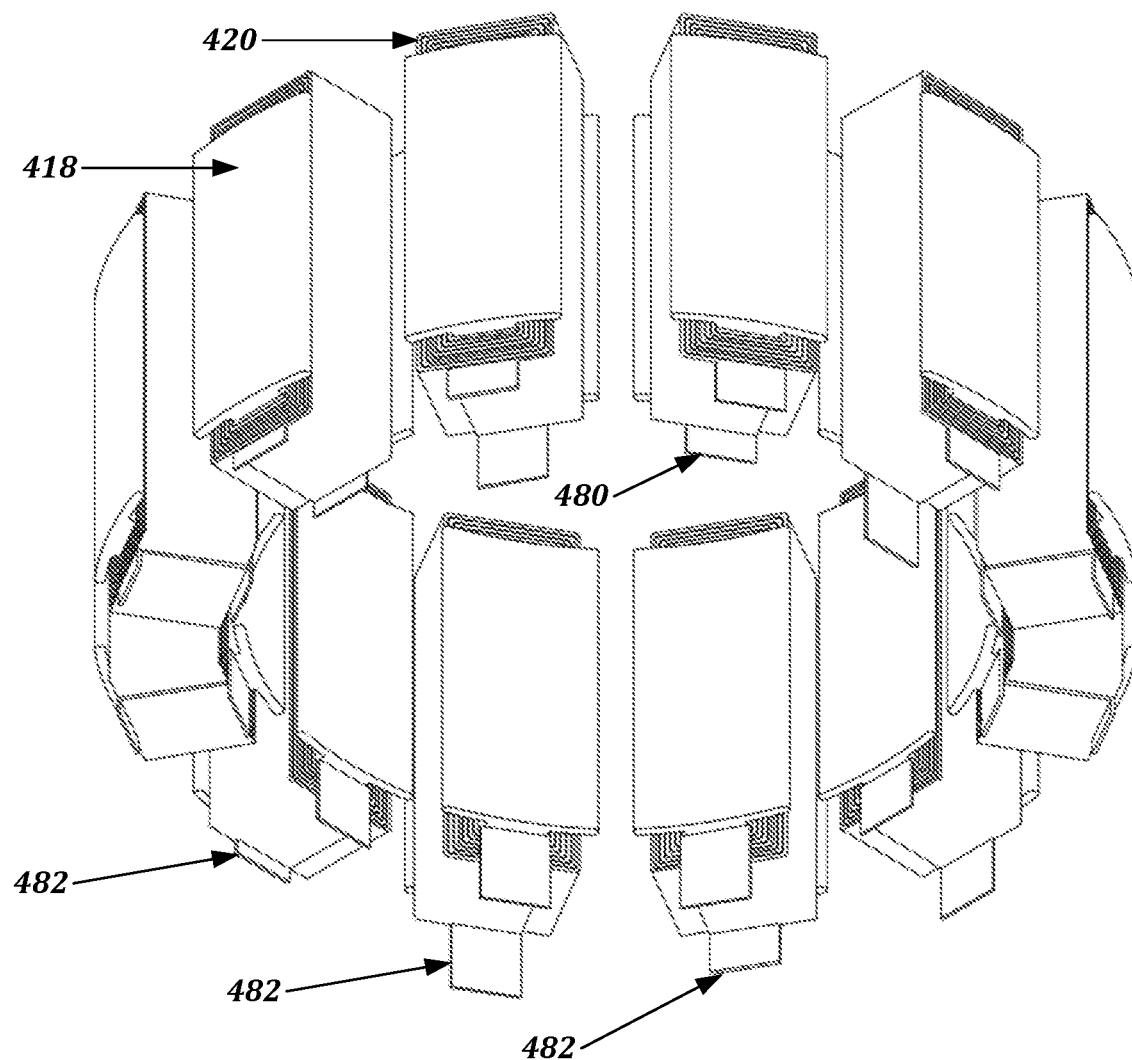
FIG. 22 illustrates a perspective view of at least a portion of the apparatus 100.

In further embodiments, the double rotor 200 may comprise an inner rotor 210, illustrated at least in FIGS. 10-11 and 15. The inner rotor 210 may be used to receive an electromagnetic force from the stator 400. The inner rotor 210 may comprise a first set of a plurality of North (N)-pole and South (S)-pole magnets 212 disposed alternately in annular and/or circumferential form, illustrated at least in FIGS. 10-11 and 15. In some embodiments, the inner rotor 210 (and/or the first set of a plurality of N-pole and S-pole magnets 212) may be secured to (an outer portion of) the rotor housing inner wall 208.

In further embodiments, the double rotor 200 may comprise an outer rotor 214, illustrated at least in FIGS. 10-11 and 15. The outer rotor 214 may be used to receive an electromagnetic force from the stator 400. The outer rotor 214 may comprise a second set of a plurality of N-pole and S-pole magnets 216 disposed alternately in annular and/or circumferential form, illustrated at least in FIGS. 10-11 and 15. In some embodiments, the outer rotor 214 (and/or the second set of a plurality of N-pole and S-pole magnets 216) may be secured to (an inner portion of) the rotor housing outer wall 206.

B. Rotational Shaft Module 300

At least FIGS. 1-3 and 16A-16B illustrates the rotational shaft module 300 consistent with an embodiment of the disclosure. The rotational shaft module 300 may be used to allow and/or facilitate rotational motion of the double rotor 200 resultant from magnetic flux and/or electromagnetic forces applied to at least a portion of the double rotor 200.

In some embodiments, the rotational shaft module 300 may be rotatably mounted and through an inner aperture of the double rotor housing 202.

In further embodiments, the rotational shaft module 300 may be operatively connected to at least a portion of the double rotor 200.

In further embodiments, rotation of the rotational shaft module 300 may be synchronized with the frequency of supply current (via an electric controller and/or hall sensor). In some embodiments, the rotation period may be equal to an integral number of AC cycles.

In further embodiments, the rotational shaft module 300 may be secured to the double rotor 200 (and/or other parts of the apparatus 100) via nuts, bolts, screws, welding, adhesive, friction fit, and/or any other suitable securing means.

C. Stator 400

At least FIGS. 4-7 illustrate the stator 400 consistent with an embodiment of the disclosure. The stator 400 may be used to receive an (direct) electrical current, thereby inducing an electromagnetic force (and/or field). At least a portion of the stator 400 may be secured to other portions of the stator 400 and/or other portions (and/or components) of the apparatus 100 via nuts, bolts, screws, welding, adhesive, friction fit, and/or any other suitable securing means.

Figure 4:
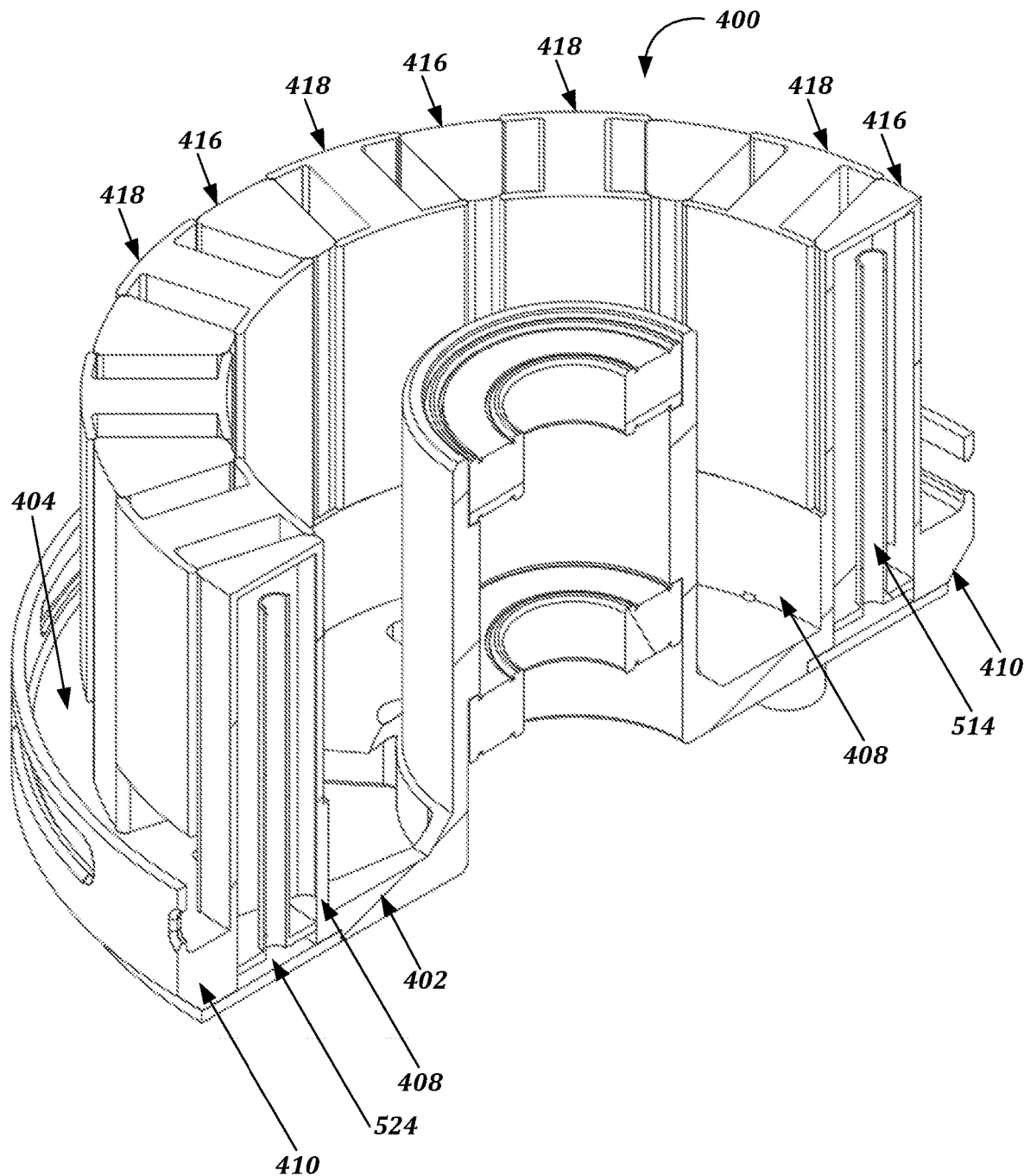
FIG. 4 illustrates a cross-sectional view of a portion of the apparatus 100 comprising a stator 400.
Figure 5:
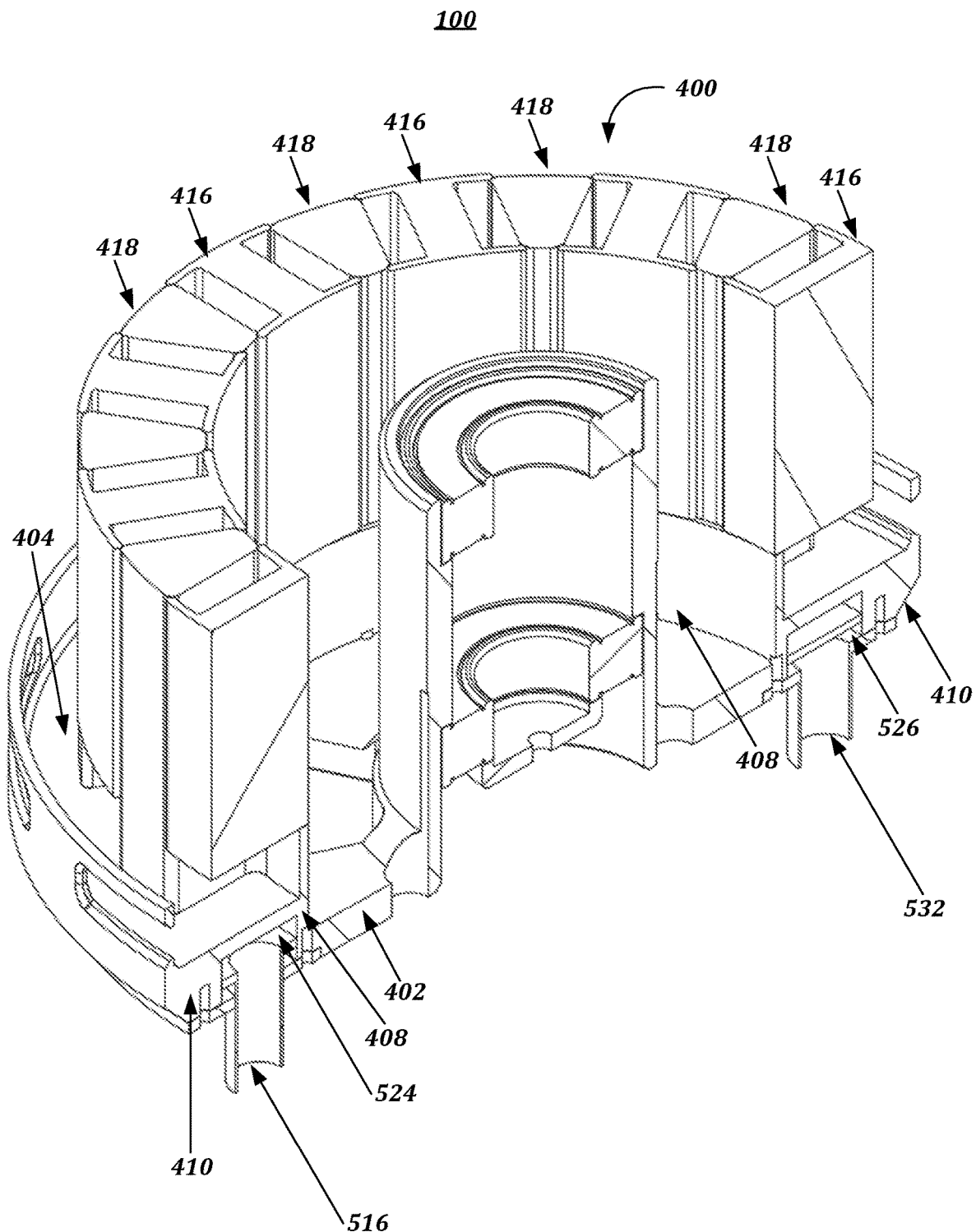
FIG. 5 illustrates another cross-sectional view of a portion of the apparatus 100 comprising the stator 400.

In some embodiments, the stator 400 may comprise a stator base portion 402, illustrated at least in FIGS. 4-5. The stator base portion 402 may be used to house various portions and/or components of the stator 400. In some embodiments, at least a portion of the stator base portion 402 may be ring shaped and/or any other suitable shape. In further embodiments, at least a portion of the stator base portion 402 may have a square and/or rectangular cross-section. In further embodiments, the stator base portion 402 may comprise a stator base top surface 404, illustrated at least in FIGS. 4-5. In further embodiments, the stator base portion 402 may comprise a stator base bottom surface 406, illustrated at least in FIG. 7. In further embodiments, the stator base portion 402 may comprise a recess configured to receive at least a portion of the fluid distribution system 500 and/or form a liquid introduction cavity 524.

In further embodiments, the stator base portion 402 may comprise a stator inner wall 408, illustrated at least in FIG. 4. The stator inner wall 408 may span an inner perimeter of the stator base portion 402. The stator inner wall 408 may be oriented orthogonally to the stator base top surface 404 and/or the stator base bottom surface 406.

In further embodiments, the stator base portion 402 may comprise a stator outer wall 410, illustrated at least in FIGS. 1 and 4-7. The stator outer wall 410 may span an outer perimeter of the stator base portion 402. The stator outer wall 410 may be oriented orthogonally to the stator base top surface 404 and/or the stator base bottom surface 406.

Figure 7:
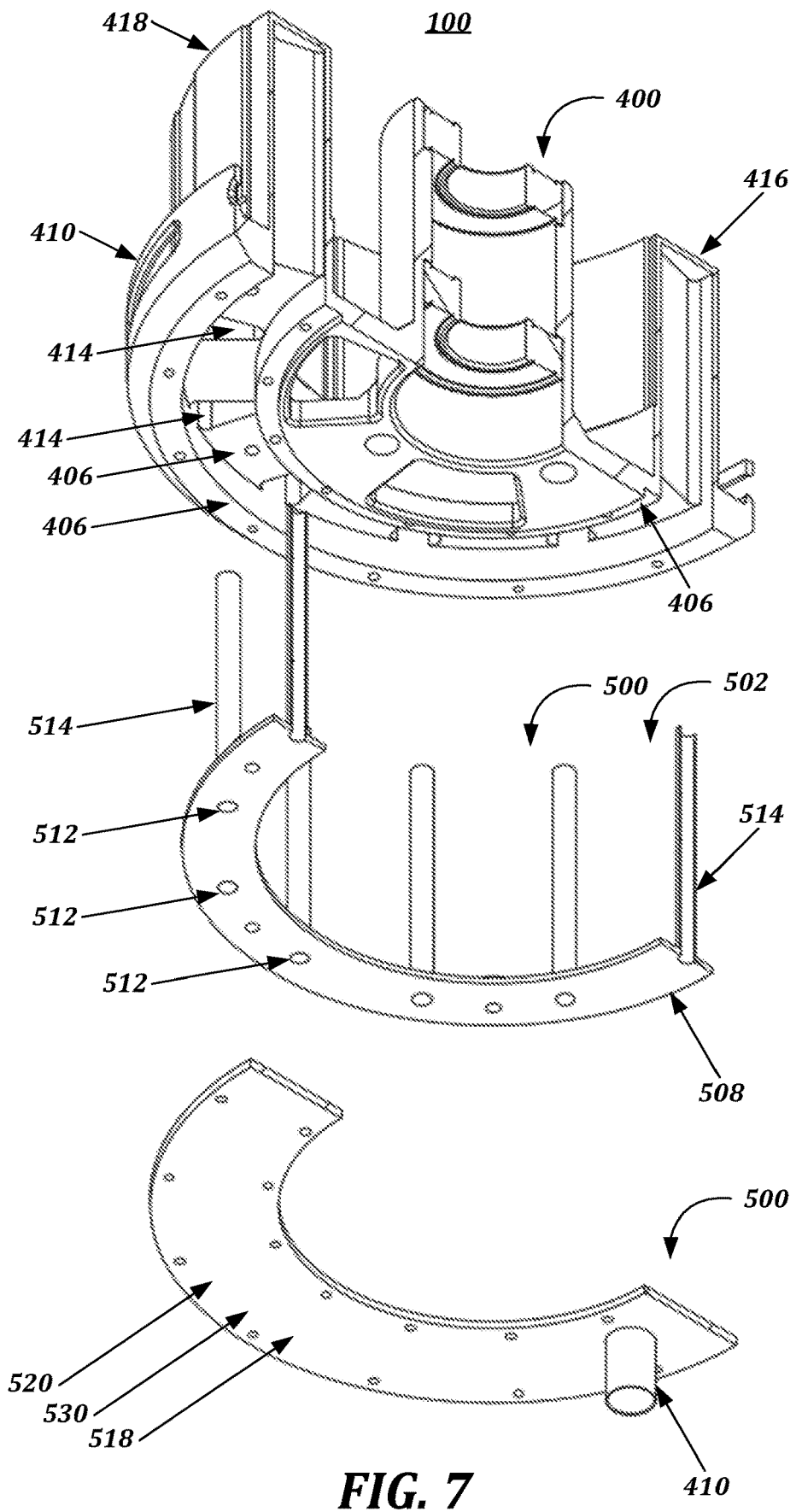
FIG. 7 illustrates an exploded cross-sectional view of portions of the apparatus 100.

In further embodiments, the stator 400 may comprise a plurality of cooling structure apertures 414, illustrated at least in FIG. 7. The plurality of cooling structure apertures 414 may be used facilitate and/or guide liquid channeled from a liquid introduction cavity 524 into the plurality of cooling structures 416.

In further embodiments, the stator 400 may comprise the plurality of cooling structures (and/or hollow protrusions) 416, illustrated at least in FIGS. 4-7 and 9. The plurality of cooling structures 416 may be used as a heat sink. The plurality of cooling structures 416 may be further used to transfer heat generated from the plurality of windings 420 and stator teeth 418 into liquid circulating through each of the plurality of cooling structures 416. In some embodiments, the plurality of cooling structures 416 may be disposed circumferentially and/or annually around the stator base portion 402. In further embodiments, each of the plurality of cooling structures 416 may be disposed over one of the plurality of cooling structure apertures 414. In further embodiments, the plurality of cooling structures 416 may be secured to and/or disposed on the stator base top surface 404. In further embodiments, the plurality of cooling structures 416 may define a plurality of slots therebetween.

In further embodiments, the stator 400 may comprise the plurality of stator teeth 418, illustrated at least in FIGS. 9-12B. The plurality of stator teeth 418 may be used as a base for the plurality of windings 420 to be wound around. The plurality of stator teeth 418 may be disposed in the plurality of slots formed by the placement of the plurality of cooling structures 416. Put another way, each of the plurality of stator teeth 418 may be disposed between two of the plurality of cooling structures 416. Each of the plurality of stator teeth 418 may be removable from the stator 400. The plurality of stator teeth 418 may be further used as a conductor, semiconductor, and/or insulator of (direct) electrical current. In some embodiments, the plurality of stator teeth 418 may be I-Shaped, H-shaped, and/or T-shaped. In further embodiments, the plurality of stator teeth 418 may be removable and/or interchangeable from the stator 400.

In some embodiments, the plurality of stator teeth 418 may comprise the plurality of windings 420, illustrated at least in FIGS. 9-11 and 13A-14B. The plurality of windings 420 may be used to conduct electricity and/or facilitate creation of an electromagnetic current responsive to an introduction of an electrical current sent through the plurality of windings 420. In further embodiments, the plurality of stator teeth 418 may be conductively connected to one another.

In further embodiments, the plurality of teeth 418 may be wound via one or more of pre-wound windings 424 illustrated at least in FIG. 13C. In some embodiments, at least a portion of the one or more of pre-wound windings 424 may be S-shaped. The S-shape may be preferable by, after winding around the stator tooth 418, forming a first lead 480 from an end of the innermost portion of the winding 420 and a second lead 482 from of the outermost portion of the winding 420, thereby allowing for easier connecting to other windings 420 and illustrated at least in FIGS. 18-22. In other embodiments, at least a portion of the one or more of pre-wound windings 424 may be any other suitable shape. In some embodiments, at least a portion of the one or more of pre-wound windings 424 may be a copper sheet formed in an S-shape. Having plurality of windings 420 wound from one or more of pre-wound windings 424 made from the copper sheet formed in an S-shape may provide an advantage from traditional windings and stator teeth by minimizing and/or eliminating gaps and/or space between the layers of windings 420 and/or between the winding 420 and the stator tooth 418 which the winding 420 is wound around. In some embodiments, each of the plurality of teeth 418 may be would clockwise or counterclockwise depending on the phase, pattern, and/or arrangement of the tooth 418 and/or winding 420 combination. The plurality of teeth 418 being would clockwise or counterclockwise depending on the phase, pattern, and/or arrangement of the tooth 418 and/or winding 420 combination, may allow for an increase in the amount and/or density of windings 420 (of copper coils) wound around each stator tooth 418 by up to three times the amount when compared to traditional winding methods and/or processes.

In further embodiments, the plurality of stator teeth 418 and/or stator windings 420 may be conductively (and/or electrically) connected to form a plurality of phases via a plurality of connection wires 486, illustrated at least in FIGS. 17-22. In some embodiments, each of the plurality of phases may comprise four stator teeth 418 with windings 420 connected in a predetermined arrangement and/or pattern. In some embodiments, the plurality of windings 420 may be embodied as concentrated and/or distributed windings around each of the plurality of stator teeth 418. In further embodiments, each of the plurality of windings 420 may comprise rectangular wire formed in multiple turns with each turn having a width extending in a radial direction of the subassembly and a thickness greater than the width extending circumferentially.

D. Fluid Distribution System 500

Figure 8:
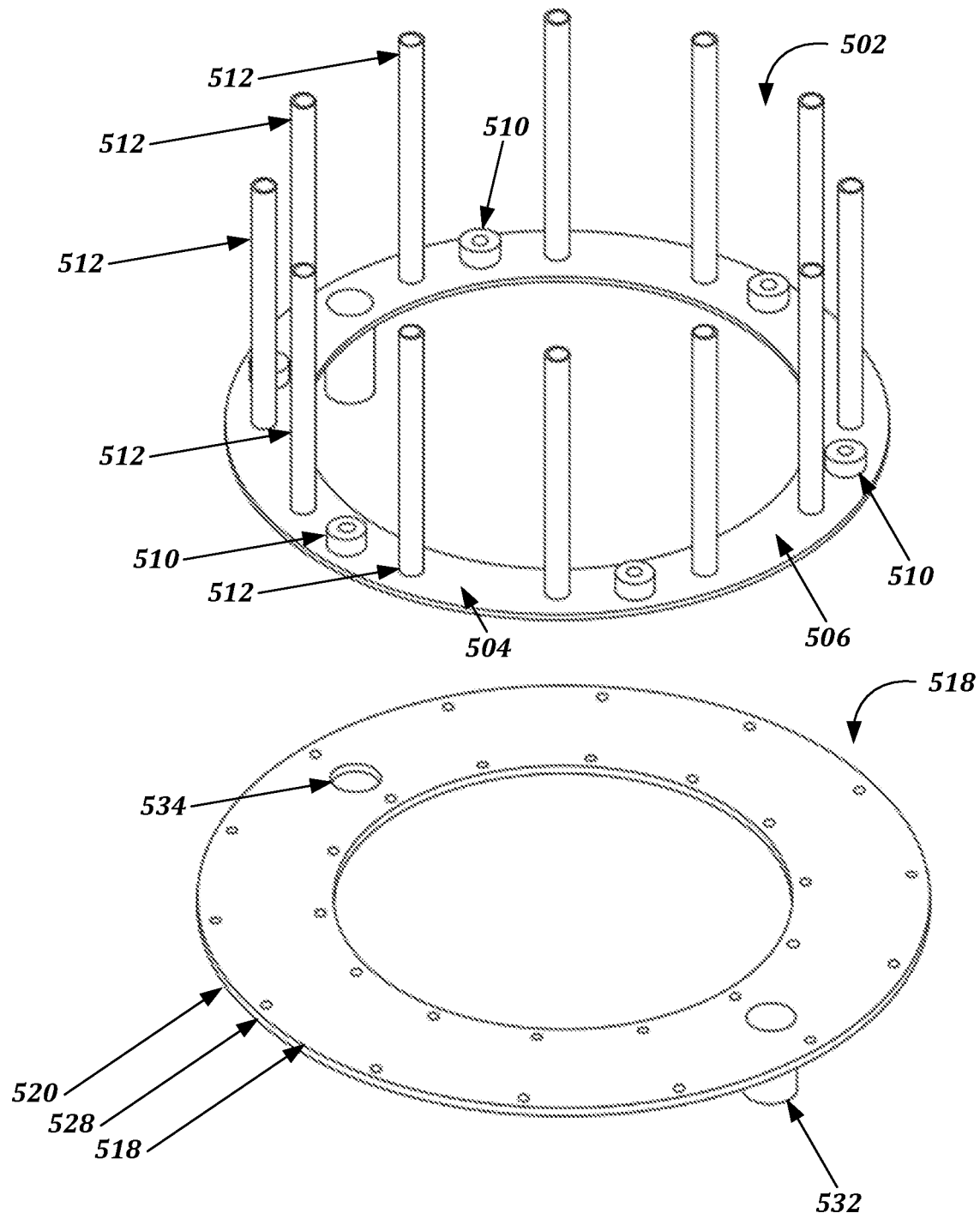
FIG. 8 illustrates a fluid distribution system 500.

At least FIGS. 7-8 illustrate the fluid distribution system 500 consistent with an embodiment of the disclosure. The fluid distribution system 500 may be used to facilitate the flow of liquid and/or fluid throughout at least a portion of the apparatus 100. The fluid distribution system 500 may be further used to transfer and/or transport heat out of the apparatus 100 and/or stator 400. At least a portion of the fluid distribution system 500 may be secured to other portions of the fluid distribution system 500 and/or other portions (and/or components) of the apparatus 100 via nuts, bolts, screws, welding, adhesive, friction fit, and/or any other suitable securing means.

Figure 9:
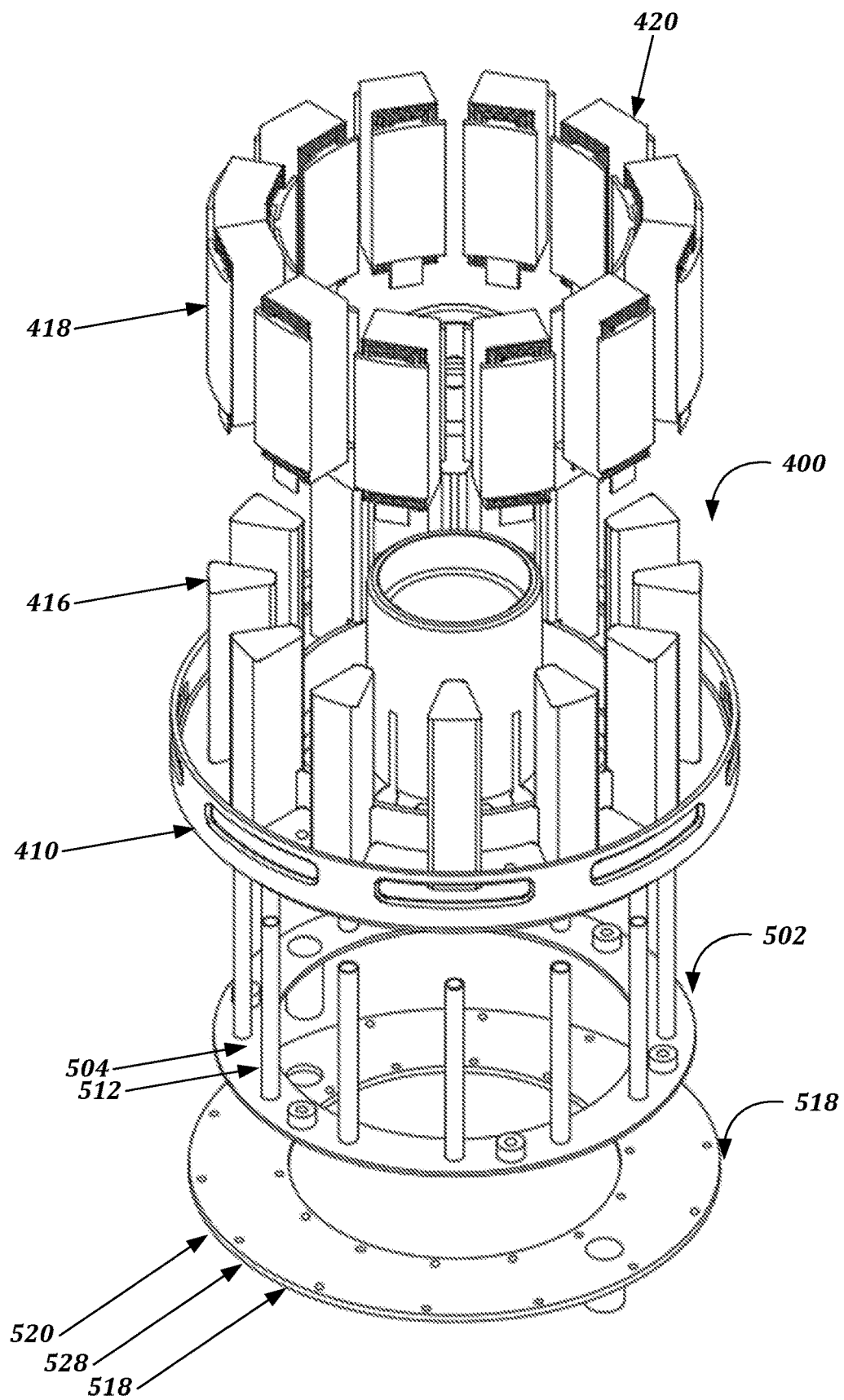
FIG. 9 illustrates an exploded view of portions of the apparatus 100.

In some embodiments, the fluid distribution system 500 may comprise a liquid introduction module 502, illustrated at least in FIGS. 7-9. The liquid introduction module 502 may be used to channel liquid into the plurality of cooling structures 416. In some embodiments, the liquid introduction module 502 may comprise a liquid introduction base portion 504, illustrated at least in FIGS. 8-9. In some embodiments, the liquid introduction base portion 504 may be planar, ring-shaped, and/or any other suitable shape. The liquid introduction base portion 504 may be used to house and/or secure various parts and/or components of the liquid introduction module 502. In some embodiments, the liquid introduction base portion 504 may comprise a liquid introduction top surface 506, illustrated at least in FIG. 8. In further embodiments, the liquid introduction base portion 504 may comprise a liquid introduction bottom surface 508, illustrated at least in FIG. 7.

In further embodiments, the liquid introduction module 502 may comprise a plurality of support members 510, illustrated at least in FIG. 8. In some embodiments, the plurality of support members 510 may be disposed on the liquid introduction top surface 506. In some embodiments, the plurality of support members 510 may be toroidal in shape with a rectangular cross-section and/or any other suitable shape. The plurality of support members 510 may be used and/or configured to contact the stator base bottom surface 406 forming the liquid introduction cavity 524 between the stator base bottom surface 406 and the liquid introduction top surface 506, illustrated at least in FIGS. 1 and 3. The liquid introduction cavity 524 may be used to (uniformly) distribute liquid from a liquid injection portion 516 into the plurality of cooling structures 416.

In further embodiments, the liquid introduction module 502 may comprise a plurality of fluid channel apertures 512. The plurality of fluid channel apertures 512 may be used to channel liquid exiting the plurality of cooling structure 416 via the plurality of fluid channels 514 into a liquid egress cavity 526.

In further embodiments, the liquid introduction module 502 may comprise the plurality of fluid channels 514, illustrated at least in FIGS. 4 and 7-8. The plurality of fluid channels 514 may be used to channel (and/or direct) fluid from the plurality of cooling structures 416, through the plurality of fluid channel apertures 512, into the liquid egress cavity 526. The liquid egress cavity 526 may be used to collect liquid used for cooling the apparatus 100 (and/or plurality of stator teeth 418 and/or plurality of windings 420) from the plurality of cooling structures 416 and channel (and/or direct) the liquid into a liquid outlet portion 532. Each of the plurality of cooling structures 416 may be dimensioned such that the height is enough to allow its corresponding cooling structure to fill with liquid to near the full volume of the space within the cooling structure while still allowing proper drainage and/or egress from the cooling structure. By way of nonlimiting example, at least a portion of each of the plurality of fluid channels 514 may be embodied as, but not limited to, a pipe, a duct, a channel, and/or a tube. In some embodiments, at least a portion of the plurality of fluid channels 514 may be dimensioned smaller in width, area, and/or circumference than at least a portion of the plurality of cooling structure apertures 414. In further embodiments, each of the plurality of fluid channels 514 may be secured to the liquid introduction top surface 506 on one end. In further embodiments, each of the plurality of fluid channels 514 may be disposed over one of the plurality of fluid channel apertures 512. In further embodiments, each of the plurality of fluid channels 514 may be housed within one of the plurality of cooling structures 416.

Figure 2:
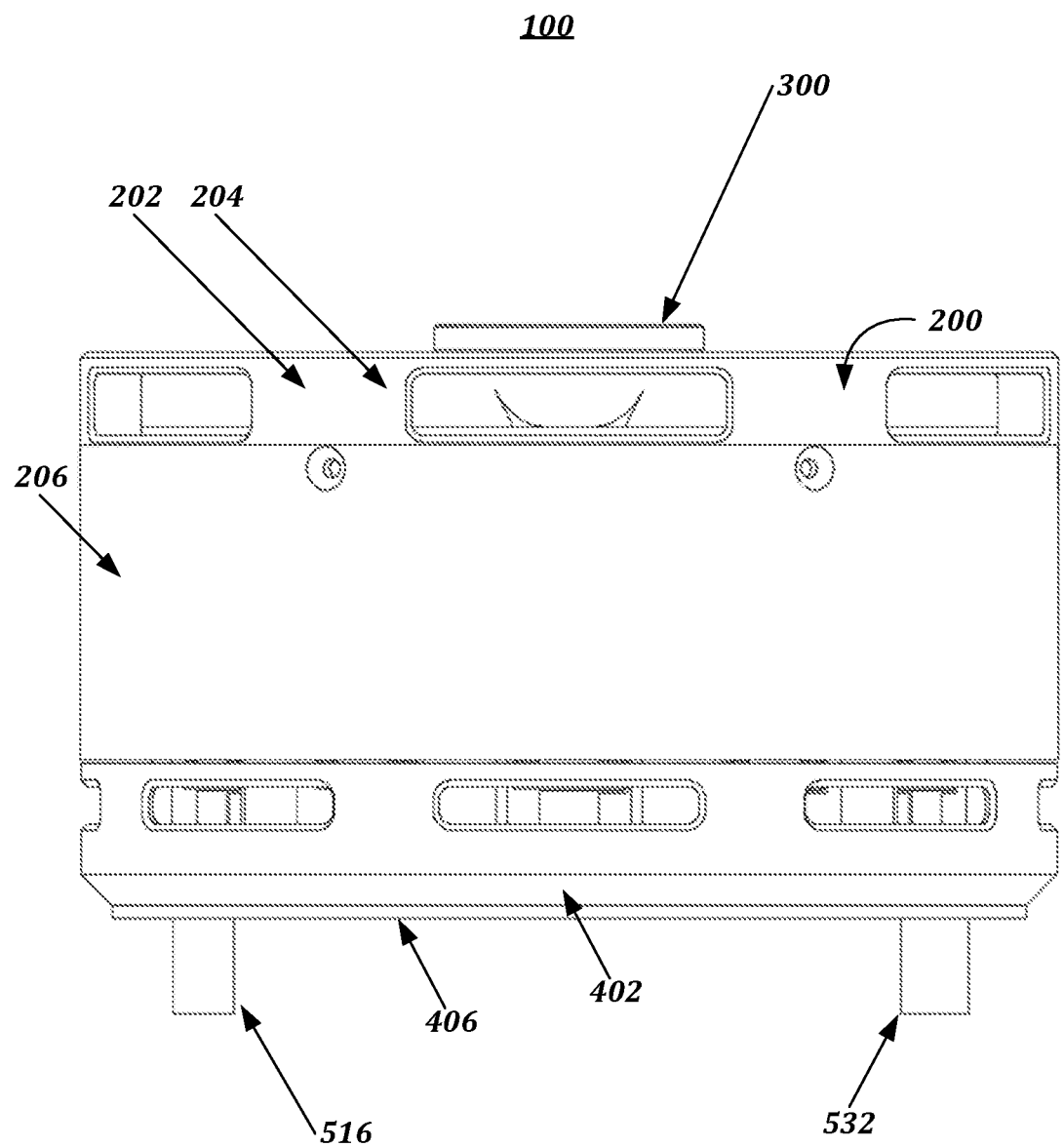
FIG. 2 illustrates a side view of the apparatus 100.
Figure 3:
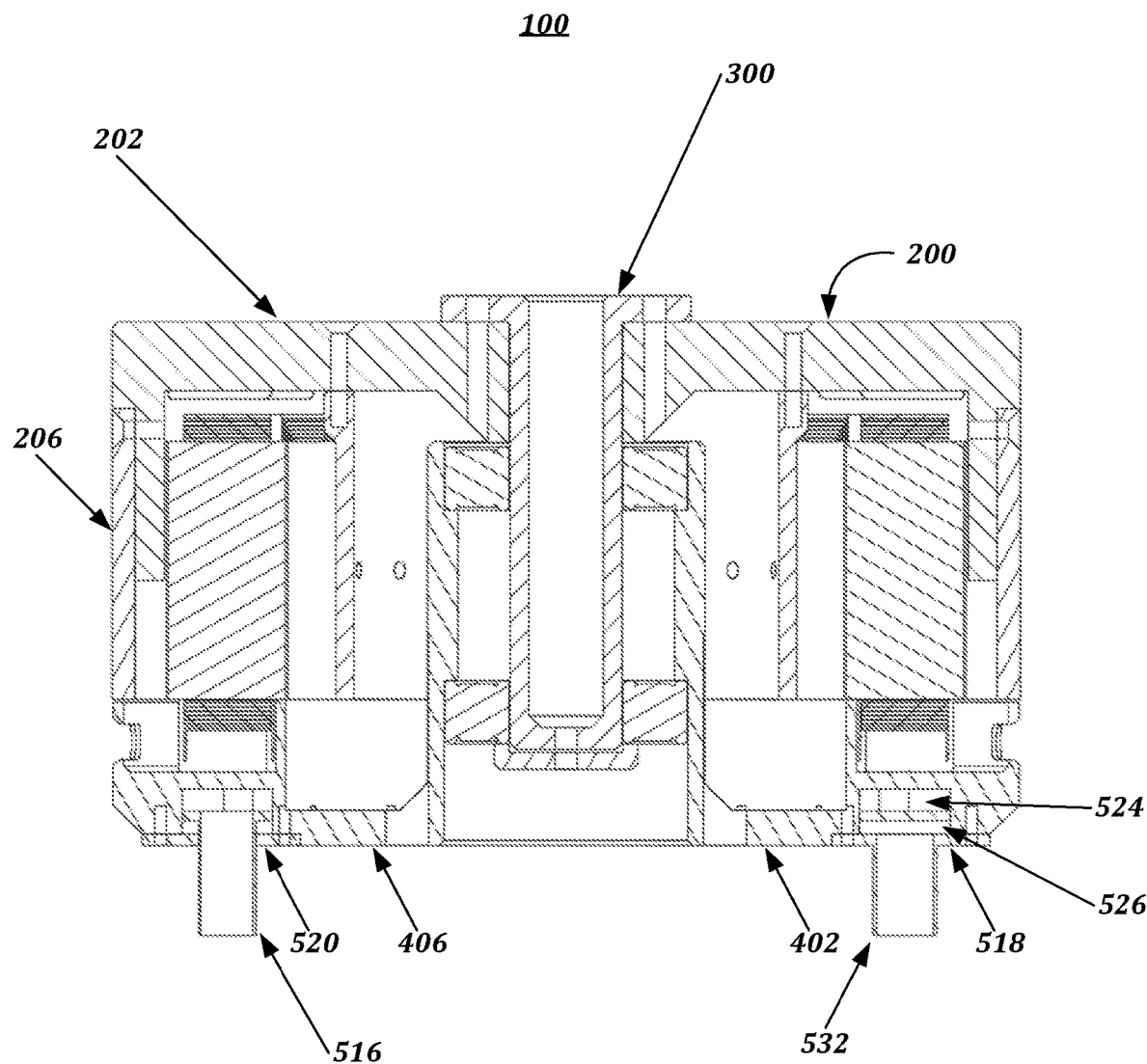
FIG. 3 illustrates a cross-sectional side view of the apparatus 100.

In further embodiments, the liquid introduction module 502 may comprise a liquid injection portion 516, illustrated at least in FIGS. 1-3. The liquid injection portion 516 may be used to introduce and/or facilitate flow into the liquid introduction module 502 (and/or the liquid introduction cavity 524). By way of nonlimiting example, at least a portion of the liquid injection portion 516 may be embodied as, but not limited to, a pipe, a duct, a channel, and/or a tube.

In further embodiments, the fluid distribution system 500 may comprise a liquid egress module 518. The liquid egress module 518 may be used to direct and/or channel liquid used to cool the plurality of stator teeth 418 and/or plurality of windings 420 via the plurality of cooling structures 416, out of the apparatus 100.

Figure 6:
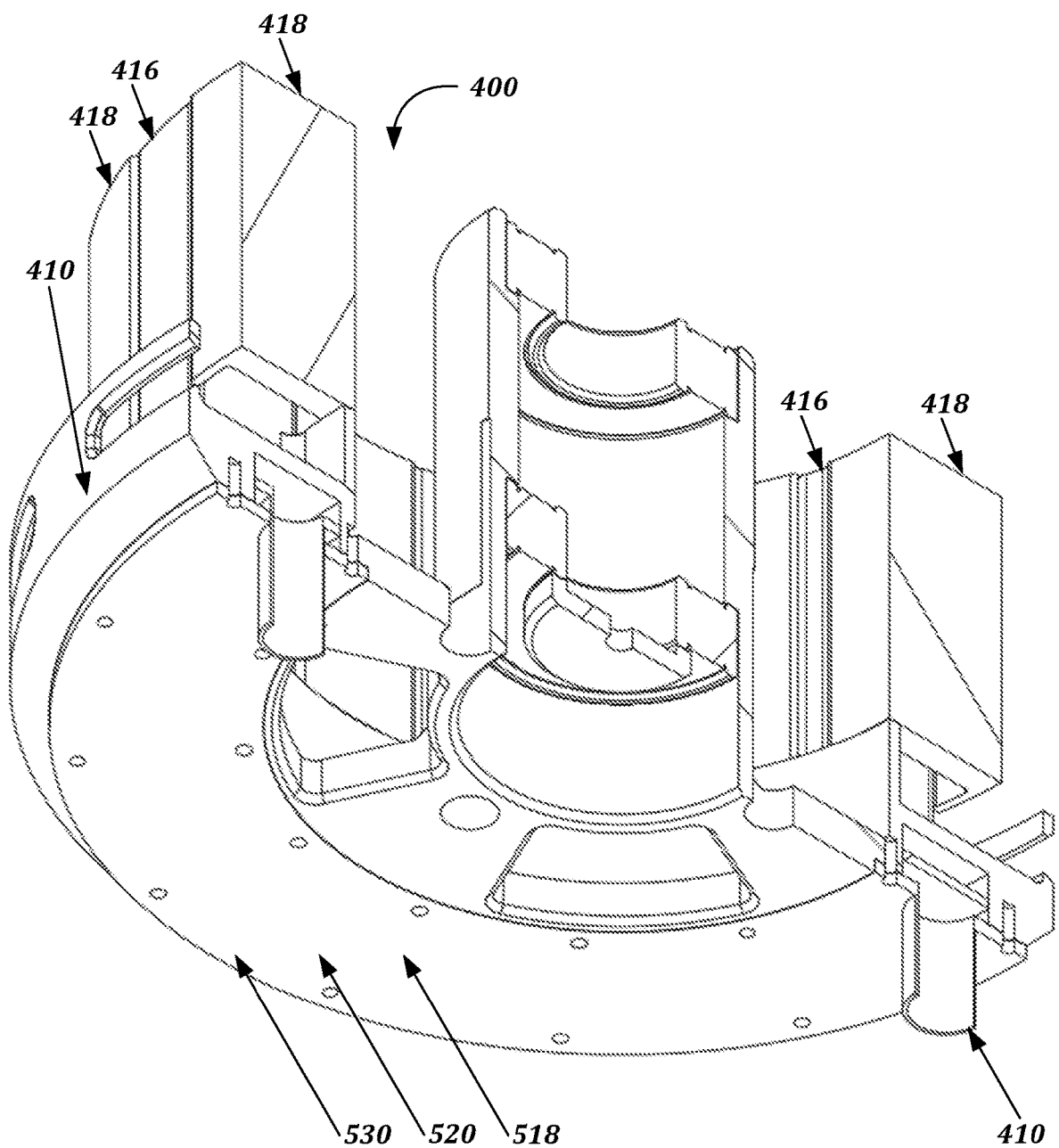
FIG. 6 illustrates another cross-sectional view of a portion of the apparatus 100 comprising the stator 400.

In some embodiments, the liquid egress module 518 may comprise a liquid egress base portion 520, illustrated at least in FIGS. 6-8. In some embodiments, the liquid egress base portion 520 may be planar, ring-shaped, and/or any other suitable shape. In further embodiments, the liquid egress base portion 520 may comprise a liquid egress top surface 528, illustrated at least in FIGS. 8-9. The liquid egress top surface 528 may be configured to secure to a bottom edge of the stator inner wall 408 and a bottom edge of the stator outer wall 410, thereby forming liquid egress cavity 526 between the liquid introduction bottom surface 508, the liquid egress top surface 528, the stator inner wall 408, and/or the stator outer wall 410, illustrated at least in FIGS. 1 and 3. In further embodiments, the liquid egress base portion 520 may comprise a liquid egress bottom surface 530, illustrated at least in FIGS. 6-7.

In some embodiments, the liquid egress module 518 may comprise a liquid injection aperture 534, illustrated at least in FIG. 8. The liquid injection aperture 534 may be used to receive and/or secure the liquid injection portion 516.

In some embodiments, the liquid egress module 518 may comprise a liquid outlet 532. The liquid outlet 532 may be used to direct and/or channel liquid used to cool the plurality of stator teeth 418 and/or plurality of windings 420 from the liquid egress cavity 526, out of the apparatus 100. By way of nonlimiting example, at least a portion of the liquid outlet 532 may be embodied as, but not limited to, a pipe, a duct, a channel, and/or a tube. In some embodiments, the liquid outlet 532 may be disposed on the liquid egress bottom surface 530.

III. Apparatus/System Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 23:
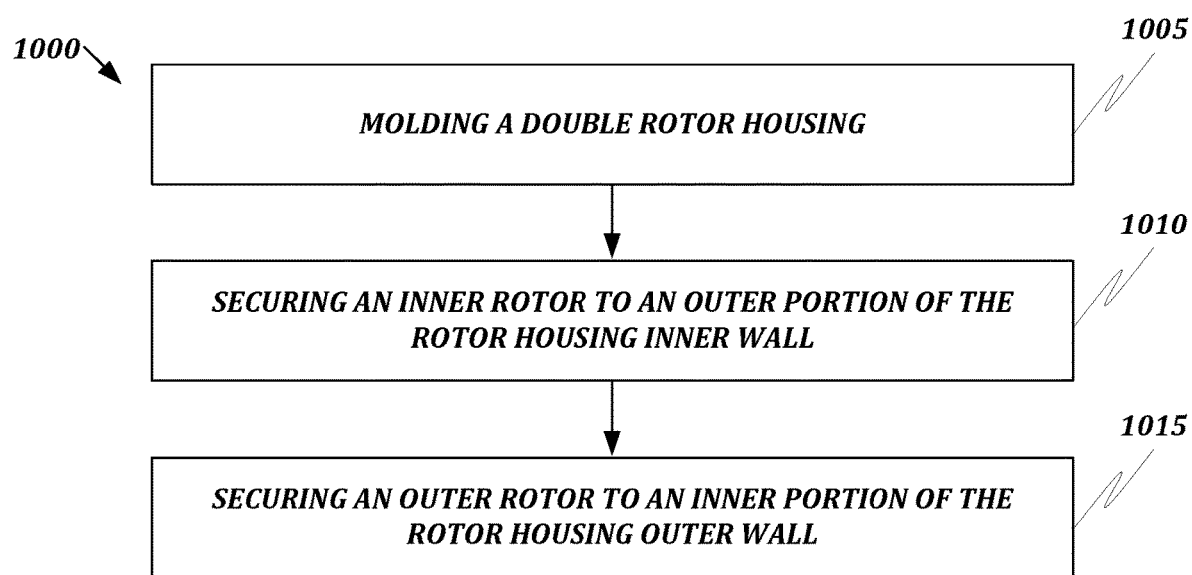
FIG. 23 illustrates method 1000 for assembling a double rotor structure for a double rotor BLDC motor with fluid cooling.

Consistent with embodiments of the present disclosure, a method 1000 for assembling a double rotor structure for a double rotor BLDC motor with fluid cooling may be performed by at least one of the aforementioned components. The method 1000, illustrated at least in FIG. 23 may comprise the following stages:

1. 1005—molding (and/or casting) a double rotor housing 202, the double rotor housing 202 comprising:
   a. a rotor housing base portion 204 being planar and ring-shaped,
   b. a rotor housing outer wall 206 extending orthogonally from an outer edge of the rotor housing base portion 204, and
   c. a rotor housing inner wall 208 extending orthogonally from an inner portion of the rotor housing base portion 204;
2. 1010—securing an inner rotor 210 to an outer portion of the rotor housing inner wall 208,
   a. the inner rotor 210 comprising a first set of a plurality of N-pole and S-pole magnets disposed alternately in annular form; and
3. 1015—securing an outer rotor 214 to an inner portion of the rotor housing outer wall 206,
   a. the outer rotor 214 comprising a second set of the plurality of N-pole and S-pole magnets disposed alternately in annular form.

Figure 24:
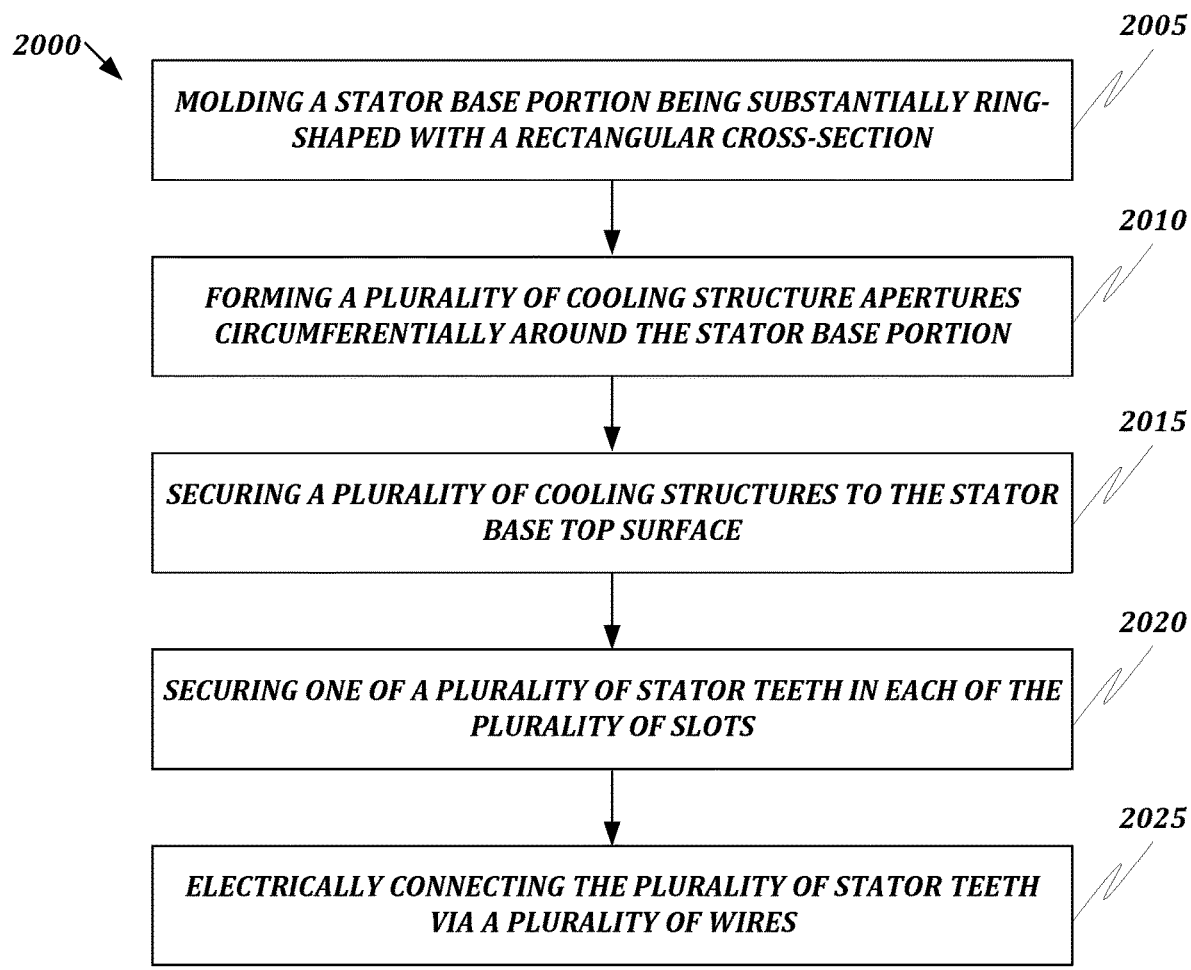
FIG. 24 illustrates a method 2000 for assembling a stator for a double rotor BLDC motor with fluid cooling.

Consistent with embodiments of the present disclosure, a method 2000 for assembling a stator for a double rotor BLDC motor with fluid cooling may be performed by at least one of the aforementioned components and/or be incorporated with any of the aforementioned methods. The method 2000, illustrated at least in FIG. 24 may comprise the following stages:

1. 2005—molding (and/or casting) a stator base portion 402 being substantially ring-shaped with a rectangular cross-section, the stator base portion 402 comprising:
   a. a stator base top surface 404,
   b. a stator base bottom surface 406,
   c. a stator inner wall 408 spanning an inner perimeter of the stator base portion, and
   d. a stator outer wall 410 spanning an outer perimeter of the stator base portion,
2. 2010—forming (and/or boring, and/or drilling) a plurality of cooling structure apertures 414 circumferentially around the stator base portion,
3. 2015—securing a plurality of cooling structures 416 to the stator base top surface 404,
   a. each of the plurality of cooling structures 416 being disposed over one of the plurality of cooling structure apertures 414 thereby defining a plurality of slots therebetween,
4. 2020—securing one of a plurality of stator teeth 416 in each of the plurality of slots,
   a. each of the plurality of stator teeth 416 comprising a plurality of windings 420 wound around at least a portion of stator tooth 416,
5. 2025—electrically connecting the plurality of stator teeth 416 via a plurality of connecting wires 486.

Figure 25:
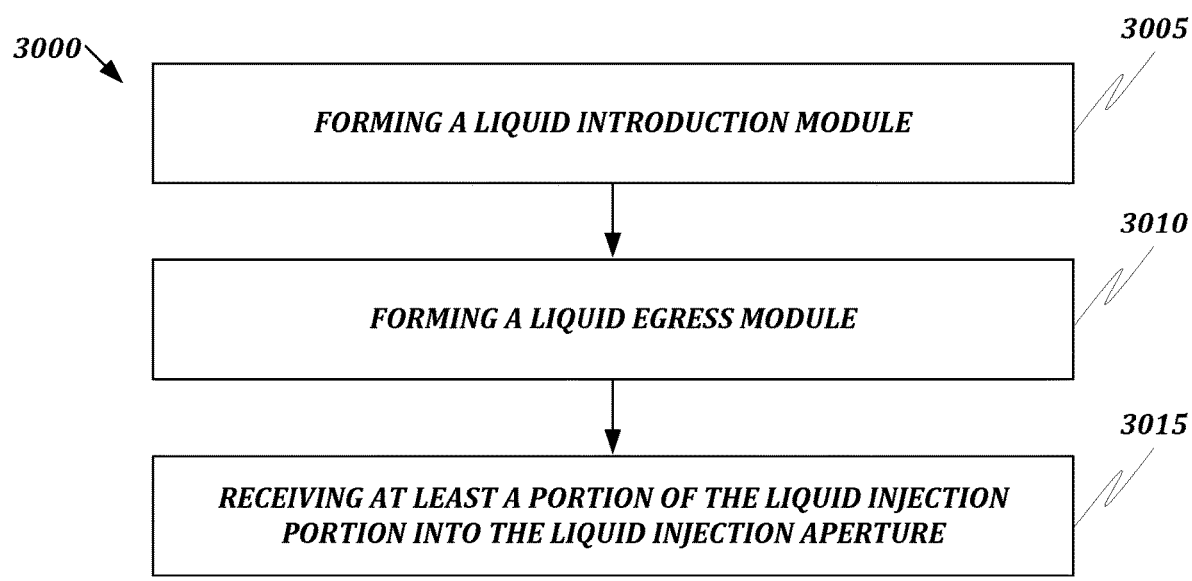
FIG. 25 illustrates a method 3000 for assembling a fluid distribution system for a double rotor BLDC motor with fluid cooling.

Consistent with embodiments of the present disclosure, a method 3000 for assembling a fluid distribution system for a double rotor BLDC motor with fluid cooling may be performed by at least one of the aforementioned components and/or be incorporated with any of the aforementioned methods. The method 3000, illustrated at least in FIG. 25, may comprise the following stages:

1. 3005—forming a liquid introduction module 502 comprising:
   a. molding (and/or casting) a liquid introduction base portion 504:
      i. being planar and ring-shaped,
      ii. having a liquid introduction top surface 506, and
      iii. having a liquid introduction bottom surface 508,
   b. securing plurality of support members 510 to the liquid introduction top surface 506,
   c. forming (and/or boring, and/or drilling) a plurality of fluid channel apertures 512 circumferentially around the liquid introduction base portion 504,
   d. securing a plurality of fluid channels 514 to the liquid introduction top surface 506,
      i. the plurality of fluid channels 514 being disposed over the plurality of fluid channel apertures 512
   e. securing a liquid injection portion 516 to the liquid introduction bottom surface 508,
      i. the liquid injection portion 516 being configured to channel a flow of liquid into the liquid introduction module 502,
2. 3010—forming a liquid egress module 518 comprising:
   a. molding (and/or casting) a liquid egress base portion 520
      i. being planar and ring-shaped,
      ii. having a liquid egress top surface 528, and
      iii. having a liquid egress bottom surface 530,
   b. forming (and/or boring, and/or drilling) a liquid injection aperture 534,
   c. securing a liquid outlet 532 to the liquid egress bottom surface 530; and
3. 3015—receiving at least a portion of the liquid injection portion 516 into the liquid injection aperture 534.

Figure 26:
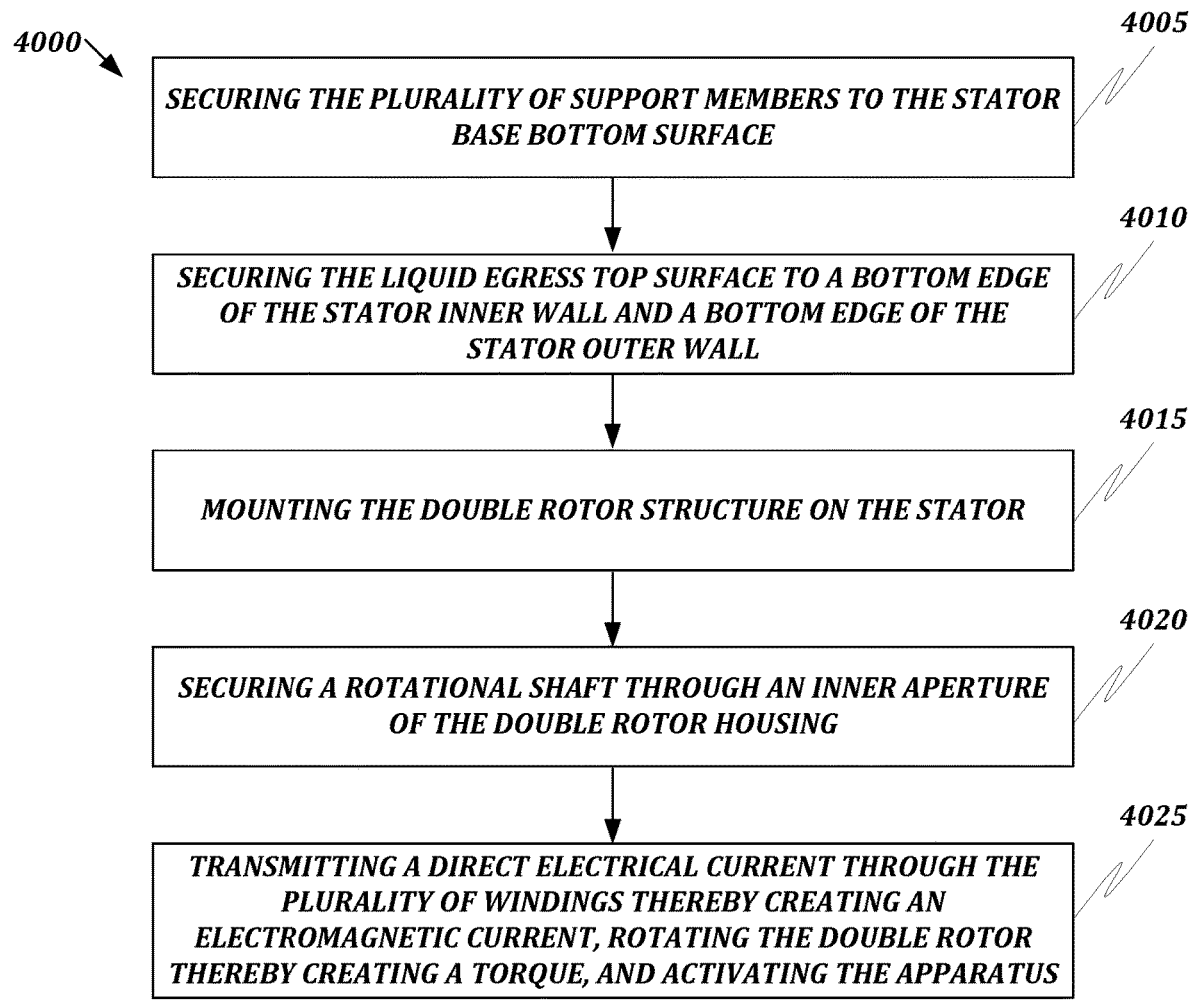
FIG. 26 illustrates a method 4000 for assembling a double rotor BLDC motor with fluid cooling.

Consistent with embodiments of the present disclosure, a method 4000 for assembling a double rotor BLDC motor with fluid cooling may be performed by at least one of the aforementioned components and/or be incorporated with any of the aforementioned methods. The method 4000, illustrated at least in FIG. 26, may comprise the following stages:

1. 4005—securing the plurality of support members 510 to the stator base bottom surface 406,
   a. thereby forming a liquid introduction cavity 524 between the stator base bottom surface 406 and the liquid introduction top surface 506,
2. 4010—securing the liquid egress top surface 528 to a bottom edge of the stator inner wall 408 and a bottom edge of the stator outer wall 410,
   a. thereby forming a liquid introduction cavity 524 between the stator base bottom surface 406 and the liquid introduction top surface 506, the liquid injection aperture 534 receiving the liquid injection portion 516;
3. 4015—mounting the double rotor structure 200 on the stator 300,
   a. such that the double rotor structure 200 can axially rotate around the stator 300,
4. 4020—securing a rotational shaft 300 through an inner aperture of the double rotor housing 202; and
5. 4025—transmitting a direct electrical current (and/or an alternating current via a three phase electronic speed controller) through the plurality of windings 420, thereby creating an electromagnetic current, rotating the double rotor 300 thereby creating a torque, and activating the apparatus 100.

It is noted that a square and/or sine commutation may be used for the apparatus 100.

Although the stages are disclosed in a particular order, it should be understood that the order is disclosed for illustrative purposes only. Stages in any of the aforementioned methods may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. Brushless motors rely on electronics (typically Hall-effect sensors), rather than mechanical brushes, to control current to the windings. Magnetic flux must be continuous throughout the entire stator circuit of the BLDC motor.

Aspect 2. A stator is a stationary component of electromagnetic circuits in motors Aspect 3. The apparatus may use be polyphase and/or 3 phase, a type of AC motor that is a specific example of a polyphase motor.

Aspect 4. Magnetic flux density at a point becomes large as a magnet is magnetized in a surface area perpendicular to the magnetization direction becoming small. When increasing magnetic resistance is present in a magnetic circuit, magnetic flux density is lowered. When length of a gap widens, magnetic flux density is decreased.

Aspect 5. The operating point of a permanent magnet is determined by a magnetic state where an auxiliary magnetic material has been removed, and shape of a magnet.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A brushless direct-current (BLDC) motor comprising:
   a double rotor comprising:
      a double rotor housing;
      an inner rotor secured to a rotor housing inner wall, the inner rotor comprising a first set of a plurality of N-pole and S-pole magnets disposed alternately in annular form,
      an outer rotor secured to a rotor housing outer wall, the outer rotor comprising a second set of the plurality of N-pole and S-pole magnets disposed alternately in annular form;
      a rotational shaft rotatably mounted through an inner aperture of the double rotor housing;

a stator comprising:
a stator base portion,
a plurality of cooling structure apertures distributed circumferentially around the stator base portion, and
a plurality of cooling structures, each of the plurality of cooling structures being disposed over one of the plurality of cooling structure apertures thereby defining a plurality of slots therebetween,
a plurality of stator teeth electrically connected to one another, each of the plurality of stator teeth being disposed in one of the plurality of slots and having a plurality of S-shaped windings wound around a middle portion of the stator tooth;
a liquid distribution system configured to transfer heat out of the motor, the liquid distribution system comprising:
a liquid introduction module positioned within a recess of the stator, the liquid introduction module comprising:
a liquid introduction base portion being planar and ring-shaped comprising:
a plurality of support members disposed on a top surface of the liquid introduction base member and configured to contact a bottom surface of the stator base portion thereby forming a cavity within the recess between the stator base portion and the liquid introduction base portion, and
a plurality of fluid channel apertures distributed proportionally in accordance with the plurality of cooling structures,
a plurality of fluid channels, each of the plurality of fluid channels being:
secured to the liquid introduction top surface on one end,
disposed over one of the plurality of fluid channel apertures,
housed within one of the plurality of cooling structures, and
configured to channel fluid out of one of the plurality of cooling structures, and
a liquid injection portion secured to a bottom surface of the liquid introduction base portion, the liquid injection portion being configured to channel a flow of liquid into the cavity and the plurality of cooling structures;
a liquid egress module comprising:
a liquid egress base portion being planar and ring-shaped and secured to an outer edge of a bottom portion of the stator and an outer edge of a bottom portion of the stator thereby forming a liquid egress cavity configured to channel used liquid directed from the cooling structures out of the apparatus via a liquid outlet disposed on a bottom surface of the liquid egress base portion.

2. The motor of claim 1, wherein the double rotor is mounted in a rotative manner relative to a stator.

3. The motor of claim 2, wherein the double rotor housing is planar and ring-shaped.

4. The motor of claim 1, wherein the stator base portion is ring-shaped with a rectangular cross-section.

5. The motor of claim 1, wherein the stator base portion comprises a stator inner wall spanning an inner perimeter of the stator base portion, the stator inner wall being oriented orthogonally to the stator base top surface and the stator base bottom surface.

6. The motor of claim 5, wherein the stator base portion comprises a stator outer wall spanning an outer perimeter of the stator base portion, the stator outer wall being oriented orthogonally to the stator base top surface and the stator base bottom surface.

7. The motor of claim 1, wherein each of the plurality of windings are wound from an S-shaped sheet of copper.

8. The motor of claim 1, wherein each of the plurality of stator teeth are I-shaped.

9. The motor of claim 8, wherein the plurality of stator teeth are electrically connected to form a plurality of phases.

10. A brushless direct-current (BLDC) motor comprising:
a double rotor structure mounted in a rotative manner relative to a stator: a double rotor housing comprising: a rotor housing base portion being planar and ring-shaped, a rotor housing outer wall extending orthogonally from an outer edge of the rotor housing base portion, and a rotor housing inner wall extending orthogonally from an inner portion of the rotor housing base portion,
an inner rotor secured to an outer portion of the rotor housing inner wall, the inner rotor comprising a first set of a plurality of N-pole and S-pole magnets disposed alternately in annular form,
an outer rotor secured to the rotor housing outer wall, the outer rotor comprising a second set of the plurality of N-pole and S-pole magnets disposed alternately in annular form, and
a rotational shaft rotatably mounted through an inner aperture of the double rotor housing;
a stator comprising:
a stator base portion being ring-shaped with a rectangular cross-section comprising:
a stator base top surface,
a stator base bottom surface,
a stator inner wall spanning an inner perimeter of the stator base portion, the stator inner wall being oriented orthogonally to the stator base top surface and the stator base bottom surface, and
a stator outer wall spanning an outer perimeter of the stator base portion, the stator outer wall being oriented orthogonally to the stator base top surface and the stator base bottom surface,
a plurality of cooling structure apertures distributed circumferentially around the stator base portion, and
a plurality of cooling structures, each of the plurality of cooling structures being:
secured to the stator base top surface, and
disposed over one of the plurality of cooling structure apertures,
a plurality of stator teeth, each of the plurality of stator teeth being disposed between two of the plurality of cooling structures and having a plurality of windings wound around a middle portion of the stator tooth being electrically connected to form a plurality of phases; and
a liquid distribution system configured to transfer heat out of the motor, the liquid distribution system comprising:
a liquid introduction module housed within a recess of a stator cavity comprising:
a liquid introduction base portion being planar and ring-shaped comprising:
a liquid introduction top surface, and
a liquid introduction bottom surface,
a plurality of support members disposed on the liquid introduction top surface and configured to contact the stator base bottom surface forming a cavity between the stator base bottom surface and the liquid introduction top surface,
a plurality of fluid channel apertures distributed proportionally in accordance with the plurality of hollow protrusions,
a plurality of fluid channels, each of the plurality of fluid channels being:

dimensioned smaller in width than each of the plurality of cooling structure apertures, secured to the liquid introduction top surface on one end, disposed over one of the plurality of fluid channel apertures, housed within one of the plurality of cooling structures, and configured to channel fluid out of one of the plurality of cooling structures into a liquid egress cavity, and a liquid injection portion secured to the bottom surface configured to channel a flow of liquid into the liquid introduction module, and a liquid egress module comprising:

a liquid egress base portion being planar and ring-shaped, the fluid egress base portion comprising:

a liquid egress top surface secured to a bottom edge of the stator inner wall and a bottom edge of the stator outer wall thereby forming a liquid egress cavity, and a liquid egress bottom surface, a liquid injection aperture configured to receive the liquid injection portion, and a liquid outlet disposed on the liquid egress bottom surface.

11. The motor of claim 10, wherein each of the plurality of windings are wound from an S-shaped sheet of copper.

12. The motor of claim 10, wherein the liquid circulating through the plurality of cooling structures collect heat radiating from the plurality of stator teeth and the plurality of windings.

13. The motor of claim 10, wherein the stator is configured to receive three phase electricity from an electronic speed controller.

14. The motor of claim 10, wherein three phase electricity is generated responsive to rotating mechanical power being applied to the rotational shaft.

15. A brushless direct-current (BLDC) motor comprising:

a double rotor comprising:

an inner rotor secured to an inner wall of a rotor housing, the inner rotor comprising a first set of a plurality of N-pole and S-pole magnets disposed alternately in annular form, an outer rotor secured to an outer wall of the rotor housing, the outer rotor comprising a second set of the plurality of N-pole and S-pole magnets disposed alternately in annular form;

a stator comprising:

a stator base portion, a plurality of cooling structures, distributed circumferentially around the stator base portion and defining a plurality of slots therebetween, a plurality of stator teeth, each of the plurality of stator teeth being disposed in one of the plurality of slots and having a plurality of windings wound around a middle portion of the stator tooth, wherein the plurality of stator teeth are electrically connected; and a liquid distribution system configured to transfer heat out of the motor, the liquid distribution system comprising:

a liquid introduction module positioned within a recess of the stator, the liquid introduction module comprising:

a liquid introduction base portion forming a cavity within the recess between the stator base portion and the liquid introduction base portion, and a plurality of fluid channels, each of the plurality of fluid channels being:

secured to a top surface of the liquid introduction base portion, housed within one of the plurality of cooling structures, and configured to channel fluid out of one of the plurality of cooling structures, and a liquid injection portion secured to a bottom surface of the liquid introduction base portion, the liquid injection portion being configured to channel a flow of liquid into the cavity and the plurality of cooling structures;

a liquid egress module comprising:

a liquid egress base portion being planar and ring-shaped and secured to a bottom portion of the stator thereby forming a liquid egress cavity configured to channel liquid directed from the cooling structures out of the apparatus via a liquid outlet of the liquid egress base portion.

16. The motor of claim 15, wherein the plurality of windings are electrically connected to form a plurality of phases and each of the plurality of windings are wound from an S-shaped sheet of copper.

17. The motor of claim 15, wherein the liquid egress cavity is formed between the liquid egress base portion and the liquid introduction base portion.

18. The motor of claim 15, wherein the liquid injection portion spans through the liquid egress base portion via a liquid egress aperture.

19. The motor of claim 15, further comprising a rotational shaft rotatably mounted through an inner aperture of the double rotor housing.

* * * * *